US012636209B2

(12) United States Patent
Poulos et al.

(10) Patent No.: US 12,636,209 B2
(45) Date of Patent: May 26, 2026

(54) BED BASE FRAME

(71) Applicant: Kreg Medical, Inc., Melrose Park, IL (US)

(72) Inventors: Craig Poulos, Chicago, IL (US); Tho Qg. Thieu, Wood Dale, IL (US); Carlos Portillo, Chicago, IL (US)

(73) Assignee: Kreg Medical, Inc., Melrose Park, IL (US)

( * ) Notice: Subject to any disclaimer, the term of this patent is extended or adjusted under 35 U.S.C. 154(b) by 577 days.

(21) Appl. No.: 18/078,770

(22) Filed: Dec. 9, 2022

(65) Prior Publication Data

US 2023/0113787 A1 Apr. 13, 2023

Related U.S. Application Data

(63) Continuation of application No. 17/590,600, filed on Feb. 1, 2022, now Pat. No. 11,523,955, which is a (Continued)

(51) Int. Cl.
*A61G 7/053* (2006.01)
*A61G 7/008* (2006.01)
(Continued)

(52) U.S. Cl.
CPC ............. *A61G 7/053* (2013.01); *A61G 7/008* (2013.01); *A61G 7/012* (2013.01); *A61G 7/018* (2013.01);
(Continued)

(58) Field of Classification Search
CPC ................................ A47C 19/024; A61G 7/05
See application file for complete search history.

(56) References Cited

U.S. PATENT DOCUMENTS

| | | | |
|---|---|---|---|
| 53,041 | A | 3/1866 | Puffer |
| 358,466 | A | 3/1887 | Lueders |

(Continued)

FOREIGN PATENT DOCUMENTS

| | | | |
|---|---|---|---|
| CA | 2580314 | C | 3/2011 |
| CA | 2618630 | C | 10/2011 |

(Continued)

OTHER PUBLICATIONS

International Search Report and Written Opinion for related International Patent Application No. PCT/US2015/049391 dated Jan. 20, 2016.

(Continued)

*Primary Examiner* — Eric J Kurilla
(74) *Attorney, Agent, or Firm* — Leydig, Voit & Mayer, Ltd.; John Augustyn

(57) ABSTRACT

A bed base frame assembly of a bed generally comprises a base frame, a plurality of steerable and lockable casters, a lateral support assembly at the first and second sides of the base frame assembly, and an in-line support assembly at the foot end of the base frame assembly. The lateral support assembly may further include: a base frame; a first leg and a second leg rotatably connected to the base frame; a first actuator connected to the first leg and the second leg, wherein the first leg and the second leg rotate from the retracted position to the extended position; a third leg and a fourth leg rotatably connected to the base frame; and a second actuator connected to the third leg and the fourth leg, wherein the third leg and the fourth leg rotate from the retracted position to the extended position.

20 Claims, 11 Drawing Sheets

Related U.S. Application Data continuation of application No. 16/124,911, filed on Sep. 7, 2018, now Pat. No. 11,266,554.

(60) Provisional application No. 62/555,935, filed on Sep. 8, 2017.

(51) Int. Cl.

| | |
|---|---|
| ***A61G 7/012*** | (2006.01) |
| ***A61G 7/015*** | (2006.01) |
| ***A61G 7/018*** | (2006.01) |
| ***A61G 7/05*** | (2006.01) |
| ***A61G 7/10*** | (2006.01) |

(52) U.S. Cl.

CPC ............ *A61G 7/0528* (2016.11); *A61G 7/015* (2013.01); *A61G 7/1046* (2013.01); *A61G 7/1067* (2013.01); *A61G 2200/16* (2013.01); *A61G 2203/70* (2013.01)

(56) References Cited

U.S. PATENT DOCUMENTS

| | | | | | |
|---|---|---|---|---|---|
| 375,448 | A | | 12/1887 | Hayward | |
| 628,700 | A | | 7/1899 | Dann | |
| 1,133,798 | A | | 3/1915 | Hall | |
| 1,253,179 | A | | 1/1918 | Irrgang | |
| 1,398,203 | A | | 11/1921 | Schmidt | |
| 1,525,864 | A | | 2/1925 | Hueseman | |
| 1,636,325 | A | | 7/1927 | Roe | |
| 1,772,310 | A | | 8/1930 | Hart | |
| 1,999,106 | A | | 4/1935 | Muller | |
| 2,034,985 | A | | 3/1936 | Lilley | |
| 2,171,251 | A | | 8/1939 | Capron | |
| 2,262,288 | A | | 11/1941 | Raleigh | |
| 2,308,592 | A | | 1/1943 | Drexler et al. | |
| 2,472,675 | A | | 6/1949 | Mueller | |
| 2,514,655 | A | | 7/1950 | Luketa | |
| 2,562,339 | A | | 7/1951 | Socol | |
| 2,656,876 | A | | 10/1953 | Larrick | |
| 2,658,211 | A | | 11/1953 | Bendersky | |
| 2,675,285 | A | | 4/1954 | Terry | |
| 2,766,463 | A | | 10/1956 | Bendersky | |
| 2,783,055 | A | | 2/1957 | Michaud | |
| 2,817,855 | A | | 12/1957 | Pratt | |
| 2,830,304 | A | | 4/1958 | Ericsson | |
| 2,838,353 | A | * | 6/1958 | Emmert ............... | A47B 3/0812<br>108/125 |
| 2,956,290 | A | | 10/1960 | Scheinerman | |
| 3,045,259 | A | | 7/1962 | Mayer | |
| 3,064,278 | A | | 11/1962 | Broyles | |
| 3,081,463 | A | | 3/1963 | Williams et al. | |
| 3,090,971 | A | | 5/1963 | MacDonald | |
| 3,093,839 | A | | 6/1963 | Higgins | |
| 3,094,713 | A | | 6/1963 | Wise | |
| 3,112,500 | A | | 12/1963 | MacDonald | |
| 3,149,349 | A | | 9/1964 | Nelson | |
| 3,174,161 | A | | 3/1965 | Black | |
| 3,210,779 | A | | 10/1965 | Herbold | |
| 3,220,022 | A | | 11/1965 | Nelson | |
| 3,234,570 | A | | 2/1966 | Hutt | |
| 3,237,212 | A | | 3/1966 | Hillenbrand et al. | |
| 3,239,853 | A | | 3/1966 | MacDonald | |
| 3,262,133 | A | | 7/1966 | Beitzel | |
| 3,281,141 | A | | 10/1966 | Smiley et al. | |
| 3,327,328 | A | | 6/1967 | Slivoski | |
| 3,394,415 | A | | 7/1968 | Parker | |
| 3,422,929 | A | | 1/1969 | Oja | |
| 3,477,071 | A | | 11/1969 | Emerson | |
| 3,485,240 | A | | 12/1969 | Fountain | |
| 3,486,176 | A | | 12/1969 | Murcott | |
| 3,495,869 | A | | 2/1970 | Ingemansson | |
| 3,506,989 | A | | 4/1970 | Ross et al. | |
| 3,585,660 | A | | 6/1971 | Gottfried et al. | |
| 3,593,350 | A | | 7/1971 | Knight et al. | |
| 3,605,145 | A | | 9/1971 | Graebe | |
| 3,640,520 | A | | 2/1972 | Wieland | |
| 3,646,621 | A | | 3/1972 | Fragas | |
| 3,695,701 | A | | 10/1972 | Knabusch et al. | |
| 3,701,173 | A | | 10/1972 | Whitney | |
| 3,717,885 | A | | 2/1973 | De Mare | |
| 3,737,928 | A | * | 6/1973 | Reuther ................. | A47B 91/00<br>5/310 |
| 3,781,060 | A | | 12/1973 | Pentzien | |
| 3,872,525 | A | | 3/1975 | Lea et al. | |
| 3,877,088 | A | | 4/1975 | Bouman | |
| 3,930,273 | A | | 1/1976 | Stern | |
| 3,932,903 | A | | 1/1976 | Adams et al. | |
| 3,971,083 | A | | 7/1976 | Peterson | |
| 3,974,530 | A | | 8/1976 | Lusch et al. | |
| 3,997,926 | A | | 12/1976 | England | |
| 4,017,118 | A | | 4/1977 | Cawley | |
| 4,042,988 | A | | 8/1977 | Holliday | |
| 4,084,274 | A | | 4/1978 | Willis et al. | |
| 4,103,376 | A | | 8/1978 | Benoit et al. | |
| 4,127,906 | A | | 12/1978 | Zur | |
| 4,139,917 | A | | 2/1979 | Fenwick | |
| 4,152,795 | A | | 5/1979 | Rodosta et al. | |
| 4,175,550 | A | | 11/1979 | Leininger et al. | |
| 4,183,109 | A | | 1/1980 | Howell | |
| 4,188,677 | A | | 2/1980 | Zur | |
| 4,224,706 | A | | 9/1980 | Young et al. | |
| 4,225,988 | A | | 10/1980 | Cary et al. | |
| 4,227,269 | A | | 10/1980 | Johnston | |
| 4,258,445 | A | | 3/1981 | Zur | |
| 4,270,233 | A | | 6/1981 | Mulligan | |
| 4,271,547 | A | | 6/1981 | Grossutti | |
| 4,277,858 | A | | 7/1981 | Bohme | |
| 4,346,487 | A | | 8/1982 | Holdt | |
| 4,370,765 | A | | 2/1983 | Webber | |
| 4,375,706 | A | | 3/1983 | Finnhult | |
| 4,376,317 | A | | 3/1983 | Johnston | |
| 4,391,009 | A | | 7/1983 | Schild et al. | |
| 4,409,695 | A | | 10/1983 | Johnston et al. | |
| 4,432,359 | A | | 2/1984 | James | |
| 4,449,261 | A | | 5/1984 | Magnusson | |
| 4,485,505 | A | | 12/1984 | Paul | |
| 4,494,259 | A | | 1/1985 | Miller et al. | |
| 4,507,814 | A | | 4/1985 | Zyki, Jr. | |
| 4,509,217 | A | | 4/1985 | Therrien | |
| 4,545,084 | A | | 10/1985 | Peterson | |
| 4,612,679 | A | | 9/1986 | Mitchell | |
| 4,613,182 | A | | 9/1986 | Stone | |
| 4,613,997 | A | | 9/1986 | Langdale | |
| 4,632,450 | A | | 12/1986 | Holdt | |
| 4,639,954 | A | | 2/1987 | Speed | |
| 4,653,129 | A | | 3/1987 | Kuck et al. | |
| 4,654,903 | A | | 4/1987 | Chubb et al. | |
| 4,658,450 | A | | 4/1987 | Thompson | |
| 4,669,136 | A | | 6/1987 | Waters et al. | |
| 4,672,698 | A | | 6/1987 | Sands | |
| 4,679,569 | A | | 7/1987 | Lee | |
| 4,686,725 | A | | 8/1987 | Mitchell | |
| 4,700,417 | A | | 10/1987 | McGovern | |
| 4,706,313 | A | | 11/1987 | Murphy | |
| 4,709,790 | A | | 12/1987 | Freitag et al. | |
| 4,724,554 | A | | 2/1988 | Kowalski et al. | |
| 4,724,555 | A | | 2/1988 | Poehner et al. | |
| 4,787,104 | A | | 11/1988 | Grantham | |
| 4,821,351 | A | | 4/1989 | Bergenwall | |
| 4,829,616 | A | | 5/1989 | Walker | |
| 4,847,929 | A | | 7/1989 | Pupovic | |
| 4,852,195 | A | | 8/1989 | Shulman | |
| 4,862,529 | A | | 9/1989 | Peck | |
| 4,862,530 | A | | 9/1989 | Chen | |
| 4,862,538 | A | | 9/1989 | Spann et al. | |
| 4,864,671 | A | | 9/1989 | Evans | |
| 4,897,890 | A | | 2/1990 | Walker | |
| 4,899,404 | A | | 2/1990 | Galumbeck | |
| 4,901,387 | A | | 2/1990 | Luke | |
| 4,918,829 | A | | 4/1990 | Harris | |
| 4,941,221 | A | | 7/1990 | Kanzler | |
| 4,944,054 | A | | 7/1990 | Bossert | |
| 4,947,496 | A | | 8/1990 | Connolly | |

(56) References Cited

U.S. PATENT DOCUMENTS

| | | | |
|---|---|---|---|
| 4,947,500 | A | 8/1990 | Seiler |
| 4,949,414 | A | 8/1990 | Thomas et al. |
| 4,953,243 | A | 9/1990 | Birkmann |
| 4,953,247 | A | 9/1990 | Hasty |
| 4,962,552 | A | 10/1990 | Hasty |
| 4,977,629 | A | 12/1990 | Jones |
| 4,985,946 | A | 1/1991 | Foster et al. |
| 4,986,738 | A | 1/1991 | Kawasaki et al. |
| 4,993,089 | A | 2/1991 | Solomon et al. |
| 4,997,200 | A | 3/1991 | Earls |
| 5,023,967 | A | 6/1991 | Ferrand |
| 5,025,519 | A | 6/1991 | Spann et al. |
| 5,031,261 | A | 7/1991 | Fenner, Sr. |
| 5,039,158 | A | 8/1991 | Maier |
| 5,040,253 | A | 8/1991 | Cheng |
| 5,050,899 | A | 9/1991 | Stensby |
| 5,070,560 | A | 12/1991 | Wilkinson |
| 5,072,463 | A | 12/1991 | Willis |
| 5,077,843 | A | 1/1992 | Foster et al. |
| 5,083,332 | A | 1/1992 | Foster et al. |
| 5,083,334 | A | 1/1992 | Huck et al. |
| 5,084,925 | A | 2/1992 | Cook |
| 5,092,007 | A | 3/1992 | Hasty |
| 5,095,561 | A | 3/1992 | Green et al. |
| 5,103,519 | A | 4/1992 | Hasty |
| 5,107,558 | A | 4/1992 | Lück |
| 5,109,560 | A | 5/1992 | Uetake |
| 5,117,521 | A | 6/1992 | Foster et al. |
| 5,121,513 | A | 6/1992 | Thomas et al. |
| 5,129,115 | A | 7/1992 | Higgins et al. |
| 5,129,116 | A | 7/1992 | Borders et al. |
| 5,129,117 | A | 7/1992 | Celestina et al. |
| 5,157,787 | A | 10/1992 | Donnellan et al. |
| 5,157,800 | A | 10/1992 | Borders |
| 5,163,196 | A | 11/1992 | Graebe et al. |
| 5,169,208 | A | 12/1992 | Re et al. |
| 5,179,742 | A | 1/1993 | Oberle |
| 5,179,744 | A | 1/1993 | Foster et al. |
| 5,182,826 | A | 2/1993 | Thomas et al. |
| 5,187,824 | A | 2/1993 | Stryker |
| 5,214,809 | A | 6/1993 | Stuart |
| 5,224,228 | A | 7/1993 | Larrimore |
| 5,230,113 | A | 7/1993 | Foster et al. |
| 5,233,974 | A | 8/1993 | Senoue et al. |
| 5,243,721 | A | 9/1993 | Teasdale |
| 5,249,319 | A | 10/1993 | Higgs |
| 5,252,278 | A | 10/1993 | Spann et al. |
| 5,259,079 | A | 11/1993 | Visser et al. |
| 5,267,365 | A | 12/1993 | Walter |
| 5,279,010 | A | 1/1994 | Ferrand et al. |
| 5,325,551 | A | 7/1994 | Tappel et al. |
| 5,329,657 | A | 7/1994 | Bartley et al. |
| 5,331,698 | A | 7/1994 | Newkirk et al. |
| 5,335,651 | A | 8/1994 | Foster et al. |
| 5,337,845 | A | 8/1994 | Foster et al. |
| 5,342,114 | A | 8/1994 | Burke et al. |
| 5,347,682 | A | 9/1994 | Edgerton, Jr. |
| 5,348,367 | A | 9/1994 | Mizelle |
| 5,366,036 | A | 11/1994 | Perry |
| 5,370,111 | A | 12/1994 | Reeder et al. |
| 5,375,910 | A | 12/1994 | Murphy |
| 5,377,370 | A | 1/1995 | Foster et al. |
| D355,322 | S | 2/1995 | Ackley et al. |
| 5,394,581 | A | 3/1995 | Leoutsakos |
| 5,398,354 | A | 3/1995 | Balonick et al. |
| 5,398,357 | A | 3/1995 | Foster |
| 5,402,544 | A | 4/1995 | Crawford et al. |
| 5,412,821 | A | 5/1995 | Wilkinson |
| 5,425,148 | A | 6/1995 | Ashcraft et al. |
| 5,438,723 | A * | 8/1995 | Carroll .................. A61G 7/002 5/618 |
| 5,444,883 | A | 8/1995 | Lura |
| 5,454,126 | A | 10/1995 | Foster et al. |
| 5,454,142 | A | 10/1995 | Neely et al. |
| 5,457,831 | A | 10/1995 | Foster et al. |
| 5,461,741 | A | 10/1995 | Graebe |
| 5,479,665 | A | 1/1996 | Cassidy et al. |
| 5,479,666 | A | 1/1996 | Foster et al. |
| 5,481,770 | A | 1/1996 | Ahlsten |
| 5,481,772 | A | 1/1996 | Glynn et al. |
| 5,483,709 | A | 1/1996 | Foster et al. |
| 5,485,699 | A | 1/1996 | Gabhart |
| 5,487,196 | A | 1/1996 | Wilkinson et al. |
| 5,497,766 | A | 3/1996 | Foster et al. |
| 5,502,853 | A | 4/1996 | Singleton et al. |
| 5,507,562 | A | 4/1996 | Wieland |
| 5,513,406 | A | 5/1996 | Foster et al. |
| 5,542,136 | A | 8/1996 | Tappel |
| 5,551,107 | A | 9/1996 | Graebe |
| 5,562,091 | A | 10/1996 | Foster et al. |
| 5,568,660 | A | 10/1996 | Raburn et al. |
| 5,577,279 | A | 11/1996 | Foster et al. |
| 5,580,504 | A | 12/1996 | Spann et al. |
| 5,586,346 | A | 12/1996 | Stacy et al. |
| 5,596,781 | A | 1/1997 | Graebe |
| 5,603,133 | A | 2/1997 | Vrzalik |
| 5,604,942 | A | 2/1997 | Allevato et al. |
| 5,606,754 | A | 3/1997 | Hand et al. |
| 5,611,096 | A | 3/1997 | Bartlett et al. |
| 5,613,252 | A | 3/1997 | Yu et al. |
| 5,613,255 | A | 3/1997 | Bish et al. |
| 5,620,066 | A | 4/1997 | Schuttler |
| 5,628,078 | A | 5/1997 | Pennington et al. |
| 5,630,238 | A | 5/1997 | Weismiller et al. |
| 5,634,224 | A | 6/1997 | Gates |
| 5,638,563 | A | 6/1997 | Iura |
| 5,642,546 | A | 7/1997 | Shoenhair |
| 5,649,331 | A | 7/1997 | Wilkinson et al. |
| 5,652,985 | A | 8/1997 | Wilkinson et al. |
| 5,659,910 | A | 8/1997 | Weiss |
| 5,666,681 | A | 9/1997 | Meyer et al. |
| 5,672,849 | A | 9/1997 | Foster et al. |
| 5,680,661 | A | 10/1997 | Foster et al. |
| 5,682,631 | A | 11/1997 | Weismiller |
| 5,689,845 | A | 11/1997 | Sobieralski |
| 5,692,256 | A | 12/1997 | Kramer et al. |
| 5,699,566 | A | 12/1997 | Chuang |
| 5,708,997 | A | 1/1998 | Foster et al. |
| 5,715,548 | A | 2/1998 | Weismiller et al. |
| 5,724,685 | A | 3/1998 | Weismiller et al. |
| 5,731,062 | A | 3/1998 | Kim et al. |
| 5,732,423 | A | 3/1998 | Weismiller et al. |
| 5,742,957 | A | 4/1998 | Vanzant |
| 5,745,936 | A | 5/1998 | Van McCutchen et al. |
| 5,745,937 | A | 5/1998 | Weismiller et al. |
| 5,749,112 | A | 5/1998 | Metzler |
| 5,771,511 | A | 6/1998 | Kummer et al. |
| 5,781,949 | A | 7/1998 | Weismiller et al. |
| 5,784,732 | A | 7/1998 | Vail |
| 5,790,997 | A | 8/1998 | Ruehl |
| 5,832,549 | A | 11/1998 | Le Pallec et al. |
| 5,845,352 | A | 12/1998 | Matsler et al. |
| 5,857,739 | A | 1/1999 | Smith |
| 5,860,899 | A | 1/1999 | Rassman |
| 5,878,452 | A | 3/1999 | Brooke et al. |
| 5,926,878 | A | 7/1999 | Morton et al. |
| 5,933,888 | A | 8/1999 | Foster et al. |
| 5,940,910 | A | 8/1999 | Weismiller et al. |
| 5,963,998 | A | 10/1999 | Carew et al. |
| 5,983,429 | A | 11/1999 | Stacy et al. |
| 5,987,668 | A | 11/1999 | Ackley |
| 5,996,150 | A | 12/1999 | Blevins et al. |
| 6,000,076 | A | 12/1999 | Webster et al. |
| 6,036,271 | A | 3/2000 | Wilkinson et al. |
| 6,038,717 | A | 3/2000 | Persson |
| 6,038,721 | A | 3/2000 | Gordon |
| 6,047,422 | A | 4/2000 | Yousif |
| 6,047,424 | A | 4/2000 | Osborne et al. |
| 6,058,531 | A | 5/2000 | Carroll |
| 6,058,533 | A | 5/2000 | Nelson |
| 6,089,593 | A | 7/2000 | Hanson et al. |
| 6,095,610 | A | 8/2000 | Okajima et al. |
| 6,098,222 | A | 8/2000 | Hand et al. |
| 6,112,345 | A | 9/2000 | Foster et al. |

(56) References Cited

U.S. PATENT DOCUMENTS

| | | | |
|---|---|---|---|
| 6,112,867 | A | 9/2000 | Mintgen et al. |
| 6,119,291 | A | 9/2000 | Osborne et al. |
| 6,141,806 | A | 11/2000 | Bobey et al. |
| 6,151,739 | A | 11/2000 | Meyer et al. |
| 6,154,899 | A | 12/2000 | Brooke et al. |
| 6,163,903 | A | 12/2000 | Weismiller et al. |
| 6,182,310 | B1 | 2/2001 | Weismiller et al. |
| 6,212,714 | B1 | 4/2001 | Allen et al. |
| 6,223,369 | B1 | 5/2001 | Maier et al. |
| 6,230,346 | B1 | 5/2001 | Branson et al. |
| 6,240,583 | B1 | 6/2001 | Brooke et al. |
| 6,253,397 | B1 | 7/2001 | Bartow et al. |
| 6,256,812 | B1 | 7/2001 | Bartow et al. |
| 6,256,821 | B1 | 7/2001 | Boyd |
| 6,256,822 | B1 | 7/2001 | Weston et al. |
| 6,269,504 | B1 | 8/2001 | Romano et al. |
| 6,269,505 | B1 | 8/2001 | Wilkinson |
| 6,272,702 | B1 | 8/2001 | Uchida et al. |
| 6,282,735 | B1 | 9/2001 | Stolpmann et al. |
| 6,282,737 | B1 | 9/2001 | Vrzalik |
| 6,286,166 | B1 | 9/2001 | Henley et al. |
| 6,295,675 | B1 | 10/2001 | Ellis et al. |
| 6,296,089 | B1 | 10/2001 | Koch et al. |
| 6,315,319 | B1 | 11/2001 | Hanson et al. |
| 6,320,510 | B2 | 11/2001 | Menkedick et al. |
| 6,324,709 | B1 | 12/2001 | Ikeda et al. |
| 6,336,235 | B1 | 1/2002 | Ruehl |
| 6,347,422 | B2 | 2/2002 | Heavrin |
| 6,351,863 | B1 | 3/2002 | Meyer et al. |
| 6,353,950 | B1 | 3/2002 | Bartlett et al. |
| 6,357,065 | B1 | 3/2002 | Adams |
| 6,360,385 | B1 | 3/2002 | Lewandowski |
| 6,363,552 | B1 | 4/2002 | Hornbach et al. |
| 6,374,436 | B1 | 4/2002 | Foster |
| 6,374,437 | B1 | 4/2002 | Voelker |
| 6,397,416 | B2 | 6/2002 | Brooke et al. |
| 6,401,277 | B1 | 6/2002 | Savage et al. |
| 6,415,814 | B1 | 7/2002 | Hand et al. |
| 6,427,264 | B1 | 8/2002 | Metz et al. |
| 6,427,270 | B1 | 8/2002 | Blevins et al. |
| 6,446,283 | B1 | 9/2002 | Heimbrock et al. |
| 6,460,930 | B2 | 10/2002 | Thornton |
| 6,481,033 | B2 | 11/2002 | Fogel |
| 6,484,332 | B2 | 11/2002 | Korver, II |
| 6,496,993 | B2 | 12/2002 | Allen et al. |
| 6,499,163 | B1 | 12/2002 | Stensby |
| 6,499,167 | B1 | 12/2002 | Ellis et al. |
| 6,505,368 | B1 | 1/2003 | Ellis |
| 6,516,479 | B1 | 2/2003 | Barbour |
| 6,526,609 | B2 | 3/2003 | Wong |
| 6,536,056 | B1 | 3/2003 | Vrzalik et al. |
| 6,539,566 | B1 | 4/2003 | Hayes |
| 6,547,330 | B1 | 4/2003 | Hester |
| 6,560,793 | B2 | 5/2003 | Walker |
| 6,564,409 | B2 | 5/2003 | Metz et al. |
| 6,565,112 | B2 | 5/2003 | Hanson et al. |
| 6,584,628 | B1 | 7/2003 | Kummer |
| 6,584,629 | B2 | 7/2003 | Tsuji et al. |
| 6,601,251 | B2 | 8/2003 | Paul |
| 6,601,253 | B1 | 8/2003 | Tarquinio |
| 6,611,979 | B2 | 9/2003 | Welling et al. |
| 6,622,323 | B2 | 9/2003 | Zerhusen et al. |
| 6,622,364 | B2 | 9/2003 | Hamilton et al. |
| 6,623,080 | B2 | 9/2003 | Clapper |
| 6,640,360 | B2 | 11/2003 | Hornbach et al. |
| 6,640,361 | B2 | 11/2003 | Heimbrock et al. |
| 6,643,873 | B2 | 11/2003 | Heimbrock et al. |
| 6,651,281 | B1 | 11/2003 | Figiel |
| 6,654,974 | B2 | 12/2003 | Ruehl et al. |
| 6,658,680 | B2 | 12/2003 | Osborne et al. |
| 6,662,393 | B2 | 12/2003 | Boyd |
| 6,663,184 | B2 | 12/2003 | Hagiike |
| 6,675,415 | B2 | 1/2004 | Wong |
| 6,678,908 | B2 | 1/2004 | Borders et al. |
| 6,684,427 | B2 | 2/2004 | Allen et al. |
| 6,684,436 | B1 | 2/2004 | Lovelace |
| 6,684,472 | B2 | 2/2004 | Abdelmoula et al. |
| 6,687,936 | B2 | 2/2004 | Graebe et al. |
| 6,691,346 | B2 | 2/2004 | Osborne et al. |
| 6,691,348 | B2 | 2/2004 | Plummer et al. |
| 6,691,349 | B2 | 2/2004 | Blevins |
| 6,691,350 | B2 | 2/2004 | Weismiller |
| 6,692,069 | B2 | 2/2004 | Beroth et al. |
| 6,694,548 | B2 | 2/2004 | Foster et al. |
| 6,694,549 | B2 | 2/2004 | Perez et al. |
| 6,694,557 | B1 | 2/2004 | Bobey et al. |
| 6,695,406 | B2 | 2/2004 | Plant |
| 6,698,836 | B1 | 3/2004 | Veneruso |
| 6,701,556 | B2 | 3/2004 | Romano et al. |
| 6,704,954 | B2 | 3/2004 | Metz et al. |
| 6,704,956 | B2 | 3/2004 | Riley et al. |
| 6,708,358 | B2 | 3/2004 | Hensley |
| 6,715,169 | B2 | 4/2004 | Niederkrom |
| 6,721,975 | B1 | 4/2004 | Lemire |
| 6,725,474 | B2 | 4/2004 | Foster et al. |
| 6,725,479 | B1 | 4/2004 | Stryker et al. |
| 6,726,279 | B1 | 4/2004 | Figel et al. |
| 6,728,983 | B2 | 5/2004 | Bartlett et al. |
| 6,728,985 | B2 | 5/2004 | Brooke et al. |
| 6,732,390 | B2 | 5/2004 | Krywiczanin |
| 6,745,996 | B1 | 6/2004 | Guthrie |
| 6,751,815 | B2 | 6/2004 | Heimbrock et al. |
| 6,757,924 | B2 | 7/2004 | Goodwin et al. |
| 6,779,209 | B2 | 8/2004 | Ganance |
| 6,779,340 | B2 | 8/2004 | Pfaff et al. |
| 6,781,517 | B2 | 8/2004 | Moster et al. |
| 6,782,574 | B2 | 8/2004 | Totton et al. |
| 6,791,460 | B2 | 9/2004 | Dixon et al. |
| 6,799,340 | B2 | 10/2004 | Schatz |
| 6,817,363 | B2 | 11/2004 | Biondo et al. |
| 6,820,293 | B2 | 11/2004 | Alverson |
| 6,820,294 | B2 | 11/2004 | Shiery et al. |
| 6,820,640 | B2 | 11/2004 | Hand et al. |
| 6,822,571 | B2 | 11/2004 | Conway |
| 6,823,549 | B1 | 11/2004 | Hampton |
| 6,826,793 | B2 | 12/2004 | Tekulve |
| 6,826,795 | B2 | 12/2004 | Wilkinson |
| 6,829,793 | B2 | 12/2004 | Brooke et al. |
| 6,829,796 | B2 | 12/2004 | Salvatini et al. |
| 6,839,926 | B2 | 1/2005 | Heimbrock et al. |
| 6,846,042 | B2 | 1/2005 | Hanson et al. |
| 6,851,142 | B2 | 2/2005 | Stryker et al. |
| 6,854,145 | B2 | 2/2005 | Ruehl et al. |
| 6,862,759 | B2 | 3/2005 | Hand et al. |
| 6,862,762 | B1 | 3/2005 | Johnson et al. |
| 6,866,341 | B2 | 3/2005 | Behnert |
| 6,874,179 | B2 | 4/2005 | Hensley et al. |
| 6,874,185 | B1 | 4/2005 | Phillips et al. |
| 6,874,800 | B2 | 4/2005 | George |
| 6,880,186 | B2 | 4/2005 | Johansson |
| 6,880,189 | B2 | 4/2005 | Welling et al. |
| 6,892,405 | B1 | 5/2005 | Dimitriu et al. |
| 6,897,780 | B2 | 5/2005 | Ulrich et al. |
| 6,901,617 | B2 | 6/2005 | Sprouse, II et al. |
| 6,904,631 | B2 | 6/2005 | Vrzalik et al. |
| 6,910,236 | B2 | 6/2005 | Rene |
| 6,922,863 | B2 | 8/2005 | Giori et al. |
| 6,924,441 | B1 | 8/2005 | Mobley et al. |
| 6,926,366 | B2 | 8/2005 | Wolters |
| 6,928,673 | B2 | 8/2005 | Risk, Jr. |
| 6,928,681 | B1 | 8/2005 | Stacy |
| 6,934,987 | B2 | 8/2005 | Newkirk et al. |
| 6,938,289 | B2 | 9/2005 | Morin |
| 6,951,036 | B2 | 10/2005 | Lemire |
| 6,952,846 | B2 | 10/2005 | Flannery et al. |
| 6,952,852 | B2 | 10/2005 | Reeder et al. |
| 6,976,281 | B2 | 12/2005 | Schunk et al. |
| 6,978,501 | B2 | 12/2005 | Vrzalik |
| 6,990,700 | B2 | 1/2006 | Chung |
| 6,993,799 | B2 | 2/2006 | Foster et al. |
| 7,000,272 | B2 | 2/2006 | Allen et al. |
| 7,007,323 | B2 | 3/2006 | Zerhusen et al. |
| 7,017,208 | B2 | 3/2006 | Weismiller et al. |
| 7,028,352 | B2 | 4/2006 | Kramer et al. |

(56) References Cited

U.S. PATENT DOCUMENTS

| | | | | |
|---|---|---|---|---|
| 7,028,358 | B2 | 4/2006 | Liu | |
| 7,036,166 | B2 | 5/2006 | Kramer et al. | |
| 7,039,972 | B2 | 5/2006 | Chaffee | |
| 7,044,460 | B2 | 5/2006 | Bolton | |
| 7,076,818 | B2 | 7/2006 | Kummer et al. | |
| 7,082,635 | B2 | 8/2006 | Barman et al. | |
| 7,086,107 | B2 | 8/2006 | Ellis et al. | |
| 7,107,636 | B2 | 9/2006 | Metz et al. | |
| 7,107,637 | B2 | 9/2006 | Kuek et al. | |
| 7,111,340 | B2 | 9/2006 | Mitchell et al. | |
| 7,114,207 | B2 | 10/2006 | Wang | |
| 7,120,950 | B2 | 10/2006 | Garrigues | |
| 7,120,955 | B2 | 10/2006 | Wang | |
| 7,127,762 | B1 | 10/2006 | Lau | |
| 7,171,708 | B2 | 2/2007 | Osborne et al. | |
| 7,182,323 | B2 | 2/2007 | Muller | |
| 7,188,379 | B2 | 3/2007 | James et al. | |
| 7,191,482 | B2 | 3/2007 | Romano et al. | |
| 7,191,483 | B2 | 3/2007 | Hochschild | |
| 7,213,279 | B2 | 5/2007 | Weismiller et al. | |
| 7,216,389 | B2 | 5/2007 | Ellis et al. | |
| 7,225,488 | B2 | 6/2007 | Wu | |
| 7,229,134 | B2 | 6/2007 | Ito | |
| 7,237,287 | B2 | 7/2007 | Weismiller et al. | |
| 7,237,471 | B2 | 7/2007 | Mintgen et al. | |
| 7,246,389 | B2 | 7/2007 | Taguchi et al. | |
| 7,260,860 | B2 | 8/2007 | Chambers et al. | |
| 7,263,734 | B1 | 9/2007 | Buchanan et al. | |
| 7,293,839 | B2 | 11/2007 | Shimizu | |
| 7,296,312 | B2 | 11/2007 | Menkedick | |
| 7,296,313 | B2 | 11/2007 | Hense | |
| 7,296,314 | B2 | 11/2007 | Wyatt et al. | |
| 7,313,837 | B2 | 1/2008 | Wang | |
| 7,325,265 | B2 | 2/2008 | Hornbach et al. | |
| 7,346,945 | B2 | 3/2008 | Phillips et al. | |
| 7,406,729 | B2 | 8/2008 | Hornbach et al. | |
| 7,412,734 | B2 | 8/2008 | Stryker et al. | |
| 7,430,771 | B2 | 10/2008 | Heimbrock | |
| 7,444,696 | B2 | 11/2008 | Lin et al. | |
| 7,458,119 | B2 | 12/2008 | Hornbach et al. | |
| 7,464,425 | B2 | 12/2008 | Chambers et al. | |
| 7,509,698 | B2 | 3/2009 | Poulos et al. | |
| 7,523,515 | B2 | 4/2009 | Allen et al. | |
| 7,536,739 | B2 | 5/2009 | Poulos et al. | |
| 7,568,247 | B2 | 8/2009 | Strobel et al. | |
| 7,587,776 | B2 | 9/2009 | Poulos et al. | |
| 7,600,817 | B2 | 10/2009 | Kramer | |
| 7,676,862 | B2 | 3/2010 | Poulos et al. | |
| 7,685,664 | B2 | 3/2010 | Stolpmann | |
| 7,698,761 | B2 | 4/2010 | Neuenswander et al. | |
| 7,716,766 | B2 | 5/2010 | Poulos et al. | |
| 7,743,441 | B2 | 6/2010 | Poulos et al. | |
| 7,757,318 | B2 | 7/2010 | Poulos et al. | |
| 7,774,876 | B2 | 8/2010 | Brown | |
| 7,779,494 | B2 | 8/2010 | Poulos et al. | |
| 7,784,128 | B2 | 8/2010 | Kramer | |
| 7,793,950 | B2 | 9/2010 | Van Eeden | |
| 7,832,528 | B1 | 11/2010 | Liang | |
| 7,836,531 | B2 | 11/2010 | Girard | |
| 8,056,160 | B2 | 11/2011 | Poulos et al. | |
| 8,063,785 | B2 | 11/2011 | Sacchetti | |
| 8,069,514 | B2 | 12/2011 | Poulos et al. | |
| 8,104,122 | B2 | 1/2012 | Richards et al. | |
| 8,104,123 | B2 | 1/2012 | Paz et al. | |
| RE43,155 | E | 2/2012 | Allen et al. | |
| 8,117,695 | B2 | 2/2012 | Paz et al. | |
| 8,539,625 | B2 | 9/2013 | Poulos et al. | |
| 8,566,984 | B2 | 10/2013 | Paz et al. | |
| 8,590,073 | B2 | 11/2013 | Bly | |
| 8,621,690 | B2 * | 1/2014 | Hornbach ............ | A61G 7/0528 5/613 |
| 8,793,824 | B2 | 8/2014 | Poulos et al. | |
| 8,955,176 | B1 | 2/2015 | Mullikin | |
| 9,119,753 | B2 | 9/2015 | Poulos et al. | |
| 9,320,663 | B2 | 4/2016 | Poulos et al. | |
| 9,687,401 | B2 | 6/2017 | Alford et al. | |
| 10,064,771 | B2 | 9/2018 | Poulos et al. | |
| 10,179,077 | B2 | 1/2019 | Poulos et al. | |
| 10,617,582 | B2 | 4/2020 | Poulos et al. | |
| 10,744,054 | B2 | 8/2020 | Poulos et al. | |
| 10,893,756 | B1 * | 1/2021 | Neuenswander .... | A47C 19/024 |
| 11,103,405 | B2 | 8/2021 | Poulos et al. | |
| 11,116,684 | B2 | 9/2021 | Poulos et al. | |
| 11,141,335 | B2 | 10/2021 | Poulos | |
| 11,266,554 | B2 | 3/2022 | Poulos | |
| 11,458,056 | B2 | 10/2022 | Poulos et al. | |
| 11,523,955 | B2 | 12/2022 | Poulos et al. | |
| 11,877,662 | B2 * | 1/2024 | Freelend .............. | A47C 19/025 |
| 12,150,908 | B2 | 11/2024 | Poulos et al. | |
| 12,208,041 | B2 | 1/2025 | Poulos et al. | |
| 12,239,593 | B2 | 3/2025 | Poulos et al. | |
| 12,239,594 | B2 | 3/2025 | Poulos et al. | |
| 12,478,532 | B2 | 11/2025 | Poulos et al. | |
| 2001/0048239 | A1 | 12/2001 | Kogure | |
| 2002/0059679 | A1 | 5/2002 | Weismiller | |
| 2002/0066142 | A1 | 6/2002 | Osborne | |
| 2002/0078509 | A1 | 6/2002 | Williams | |
| 2002/0174487 | A1 | 11/2002 | Kramer et al. | |
| 2003/0075966 | A1 | 4/2003 | Behnert | |
| 2003/0079293 | A1 | 5/2003 | Ellis et al. | |
| 2003/0080597 | A1 | 5/2003 | Beroth et al. | |
| 2003/0145383 | A1 | 8/2003 | Schwaegerle | |
| 2003/0167568 | A1 | 9/2003 | Brooke | |
| 2003/0172459 | A1 | 9/2003 | Roussy | |
| 2003/0177584 | A1 | 9/2003 | Boyd | |
| 2003/0208847 | A1 | 11/2003 | Vrzalik et al. | |
| 2003/0221262 | A1 | 12/2003 | Torbet et al. | |
| 2003/0221391 | A1 | 12/2003 | Bolton | |
| 2004/0010855 | A1 | 1/2004 | Piraino | |
| 2004/0034931 | A1 | 2/2004 | Kummer et al. | |
| 2004/0143904 | A1 | 7/2004 | Borders et al. | |
| 2004/0154097 | A1 | 8/2004 | Blevins | |
| 2004/0187217 | A1 | 9/2004 | Barman et al. | |
| 2004/0193078 | A1 | 9/2004 | Flick | |
| 2005/0012377 | A1 | 1/2005 | Ito | |
| 2005/0028289 | A1 | 2/2005 | Hakamiun | |
| 2005/0034764 | A1 | 2/2005 | Hanh et al. | |
| 2005/0076715 | A1 | 4/2005 | Kuklis et al. | |
| 2005/0104420 | A1 | 5/2005 | Murphy | |
| 2005/0160530 | A1 | 7/2005 | Taguchi et al. | |
| 2005/0166323 | A1 | 8/2005 | Kawakami et al. | |
| 2005/0166328 | A1 | 8/2005 | Ben-Levi | |
| 2005/0166330 | A1 | 8/2005 | Williams | |
| 2005/0172405 | A1 | 8/2005 | Menkedick | |
| 2005/0200180 | A1 | 9/2005 | Guyton | |
| 2005/0229321 | A1 | 10/2005 | Phillips et al. | |
| 2005/0262635 | A1 | 12/2005 | Wing | |
| 2006/0006724 | A1 | 1/2006 | Shimizu | |
| 2006/0021142 | A1 | 2/2006 | Hornback et al. | |
| 2006/0021144 | A1 | 2/2006 | Hornbach et al. | |
| 2006/0021145 | A1 | 2/2006 | Hornbach et al. | |
| 2006/0026762 | A1 | 2/2006 | Hornbach | |
| 2006/0026765 | A1 | 2/2006 | Hornbach et al. | |
| 2006/0026767 | A1 | 2/2006 | Chambers et al. | |
| 2006/0026768 | A1 | 2/2006 | Chambers et al. | |
| 2006/0031955 | A1 | 2/2006 | Barkhouse | |
| 2006/0031995 | A1 | 2/2006 | Barkhouse | |
| 2006/0053555 | A1 | 3/2006 | Poulos | |
| 2006/0059621 | A1 | 3/2006 | Poulos et al. | |
| 2006/0059624 | A1 | 3/2006 | Poulos et al. | |
| 2006/0101581 | A1 | 5/2006 | Blanchard et al. | |
| 2006/0150321 | A1 | 7/2006 | Brockman | |
| 2006/0167079 | A1 | 7/2006 | Menkedick et al. | |
| 2006/0168729 | A1 | 8/2006 | Weismiller et al. | |
| 2006/0168730 | A1 | 8/2006 | Menkedick et al. | |
| 2006/0168731 | A1 | 8/2006 | Menkedick et al. | |
| 2006/0195986 | A1 | 9/2006 | Hakamiun et al. | |
| 2006/0260051 | A1 | 11/2006 | Paz | |
| 2006/0272097 | A1 | 12/2006 | Dionne et al. | |
| 2006/0277683 | A1 | 12/2006 | Lamire | |
| 2007/0070684 | A1 | 3/2007 | Poulos | |
| 2007/0080030 | A1 | 4/2007 | Kramer | |
| 2007/0113352 | A1 | 5/2007 | Poulos | |
| 2007/0163043 | A1 | 7/2007 | Lemire et al. | |

(56) References Cited

U.S. PATENT DOCUMENTS

| | | | |
|---|---|---|---|
| 2007/0169267 | A1 | 7/2007 | Paz et al. |
| 2007/0234477 | A1 | 10/2007 | Dorenbeck |
| 2007/0266499 | A1 | 11/2007 | O'Keefe et al. |
| 2008/0086815 | A1 | 4/2008 | Kappeler et al. |
| 2008/0201851 | A1 | 8/2008 | Menkedick et al. |
| 2008/0211248 | A1 | 9/2008 | Lambarth |
| 2009/0106906 | A1 | 4/2009 | Soltani |
| 2009/0300845 | A1 | 12/2009 | Paz et al. |
| 2010/0005592 | A1 | 1/2010 | Poulos et al. |
| 2010/0325794 | A1 | 12/2010 | Chung |
| 2011/0030142 | A1 | 2/2011 | Karwal |
| 2011/0113556 | A1 | 5/2011 | Roussy |
| 2012/0066832 | A1 | 3/2012 | Poulos et al. |
| 2012/0073052 | A1 | 3/2012 | Meyer et al. |
| 2012/0096644 | A1 | 4/2012 | Heimbrock |
| 2012/0144588 | A1 | 6/2012 | Heimbrock |
| 2012/0198613 | A1 | 8/2012 | Jelinek |
| 2012/0198629 | A1 | 8/2012 | Hornbach |
| 2012/0286557 | A1 | 11/2012 | Hoffman et al. |
| 2013/0139318 | A1 | 6/2013 | Paz |
| 2013/0145550 | A1 | 6/2013 | Roussy et al. |
| 2015/0007393 | A1 | 1/2015 | Palashewski |
| 2015/0237432 | A1 | 8/2015 | Miluzzi et al. |
| 2016/0074265 | A1 | 3/2016 | Lyon |
| 2016/0193095 | A1 | 7/2016 | Roussy |
| 2017/0281440 | A1 | 10/2017 | Puvogel |
| 2018/0160820 | A1 | 6/2018 | Hsu |
| 2019/0076310 | A1 | 3/2019 | Poulos |
| 2019/0142671 | A1 | 5/2019 | Poulos et al. |
| 2019/0142672 | A1 | 5/2019 | Poulos et al. |
| 2019/0142673 | A1 | 5/2019 | Poulos et al. |
| 2019/0262201 | A1 | 8/2019 | Borgman |
| 2020/0008994 | A1 | 1/2020 | Poulos et al. |
| 2020/0008995 | A1 | 1/2020 | Poulos et al. |
| 2020/0230002 | A1 | 7/2020 | Poulos et al. |
| 2021/0177680 | A1 | 6/2021 | Poulos et al. |
| 2022/0023125 | A1 | 1/2022 | Poulos et al. |
| 2022/0023126 | A1 | 1/2022 | Poulos et al. |
| 2023/0181397 | A1 | 6/2023 | Poulos et al. |
| 2024/0082089 | A1 | 3/2024 | Poulos et al. |
| 2025/0170003 | A1 | 5/2025 | Poulos et al. |
| 2025/0195307 | A1 | 6/2025 | Poulos et al. |
| 2025/0241813 | A1 | 7/2025 | Poulos et al. |

FOREIGN PATENT DOCUMENTS

| | | | | | |
|---|---|---|---|---|---|
| CN | 101056557 | B | | 1/2011 | |
| DE | 8610640 | U1 | | 6/1986 | |
| DE | 8714843 | U1 | | 2/1988 | |
| DE | 4216841 | C1 | * | 8/1993 | ............ A47B 91/02 |
| EP | 0465810 | A1 | | 1/1992 | |
| EP | 1086681 | A1 | | 3/2001 | |
| EP | 1 147 757 | A2 | | 10/2001 | |
| EP | 1 621 173 | A2 | | 2/2006 | |
| EP | 1793706 | B1 | | 7/2008 | |
| GB | 183181 | A | | 7/1922 | |
| GB | 189572 | A | | 12/1922 | |
| JP | 11 221134 | A | | 10/1999 | |
| WO | WO 97/05845 | A1 | | 2/1997 | |
| WO | WO 98/04170 | A | | 2/1998 | |
| WO | WO 2004/060257 | A2 | | 7/2004 | |
| WO | WO 2006/036523 | A1 | | 4/2006 | |
| WO | WO 2007/021878 | A2 | | 2/2007 | |
| WO | WO 2013/192411 | A2 | | 12/2013 | |

OTHER PUBLICATIONS

Stryker, Isoflex Sleep Surface, 2005.

Geltec, Redux Tri-Zone Pressure/Shear Support Surface, at least as early as 2006.

Brochure for ROHO Dry Floatation Mattress System, received Nov. 2007.

Oct. 30, 2009—(WO) ISR—App. No. PCT/US09/03811.

Oct. 30, 2009—(WO) Written Opinion—App. No. PCT/US09/03811.

Information and photographs of a Vitalgo Standing Bed, at least as early as 2011.

Jan. 5, 2011—(WO) IPRP—App. No. PCT/US09/03811.

Information and Photographs of a Vitalgo Standing Bed 2008.

* cited by examiner

BED BASE FRAME

CROSS-REFERENCE TO RELATED APPLICATIONS

This application is a continuation of copending U.S. patent application Ser. No. 17/590,600, filed Feb. 1, 2022, which is a continuation of U.S. patent application Ser. No. 16/124,911, filed Sep. 7, 2018, issued as U.S. Pat. No. 11,266,554, which claims the benefit of U.S. Provisional Patent Application No. 62/555,935, filed Sep. 8, 2017, which are incorporated by reference.

TECHNICAL FIELD

The present disclosure relates generally to a patient support, and more specifically to a bed base frame that supports additional bed frames that are positionable to assist a patient to a standing position, or to any angular position between 0° (i.e., horizontal, lying position) and approximately 90° (i.e., vertical, standing position), and further to a bed base frame that has lateral supports.

BACKGROUND OF THE INVENTION

Hospital beds are well known in the art. While hospital beds according to the prior art provide a number of advantageous features, they nevertheless have certain limitations. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

BRIEF SUMMARY OF THE INVENTION

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of this disclosure may relate to a support assembly for a bed that comprises a base frame, a first support connected to the base frame; a first leg connected to the first support; a second support connected to the base frame; a second leg connected to the second support; and an actuator connected to the first leg and the second leg to cause the first and second legs to move from a retracted position to an extended position. The support assembly may further include an extension connected to a first and second end of the actuator and a linkage connecting the extension to each of the legs. Further, in the retracted position, the legs may be substantially parallel to a side member of the base frame and in the extended position, the legs may be transverse to the side member of the base frame. The first support and the second support may each comprise a flange portion and a shaft portion, with the shaft portion angled inwardly toward an opposing side of the base frame such that a longitudinal axis of the shaft portion is transverse to a vertical axis extending through a side member of the base frame. The flange portion, the linkage, and the extension may form a three-bar linkage mechanism whereby linear motion of the extension is converted into rotational motion of the legs. A first end of the actuator may include a receiver and a second end of the actuator opposite the first end may include an actuator shaft, wherein the actuator shaft transitions outwardly and inwardly from the actuator. The support assembly may further include an emergency release to allow the first and second legs to be disassociated with the actuator, so that the first and second legs can be manually moved between the retracted position and the extended position.

Other aspects of this disclosure may relate to a system for a lateral support assembly for a bed that comprises: a base frame including a first side member and a second side member; a first leg rotatably connected to the first side member of the base frame at a foot of the bed; a second leg rotatably connected to the first side member of the base frame at a head of the bed; a first actuator connected to the first leg and the second leg to cause the first and second legs to rotate from a retracted position to an extended position; a third leg rotatably connected to the second side member of the base frame at the foot of the bed; a fourth leg rotatably connected to the second side member of the base frame at the head of the bed; and a second actuator connected to the third leg and the fourth leg to cause the third and fourth legs to rotate from the retracted position to the extended position. Additionally, in the retracted position, the legs may be substantially parallel to the side members of the base frame and in the extended position, the legs may be transverse to the side members of the base frame. The lateral support assembly may further include: a first support connected to the first side member and rotatably connected with the first leg; a second support connected to the first side member rotatably connected with the second leg; a third support connected to the second side member rotatably connected with the third leg; and a fourth support connected to the second side member rotatably connected with the fourth leg. Additionally, the lateral support assembly may further include an emergency release to allow the legs to be disassociated with the actuators, so that the legs can be manually moved between the retracted position and the extended position. The lateral support assembly may further include a plurality of sensors that sense the position of the legs in both the extended position and the retracted position.

Yet other aspects of this disclosure may relate to a patient support system that comprises: a bed base frame assembly with a patient support surface; a plurality of steerable and lockable casters at a foot end and a head end of the bed base frame assembly; and a bed software to control and operate the bed base frame assembly operations. The bed base frame assembly further includes a lateral support assembly. The lateral support assembly may comprise: a base frame including a first side member and a second side member; a first leg and a second leg rotatably connected to the first side member of the base frame; a first actuator connected to the first leg and the second leg, wherein the software operates the first actuator to rotate the first leg and the second leg from the retracted position to the extended position and from the extended position to the retracted position; a third leg and a fourth leg rotatably connected to the second side member of the base frame; and a second actuator connected to the third leg and the fourth leg, wherein the software operates the second actuator to rotate the third leg and the fourth leg from the retracted position to the extended position and from the extended position to the retracted position. Additionally, when the patient support system is put into bariatric mode and a set of width extenders are utilized, the bed software may operate the first and second actuators to rotate the legs to the extended position. When the patient support system is put into tilt mode and the patient support surface is angularly rotated to a substantially vertical position, the bed software may operate the first and second actuators to rotate the legs to the extended position prior to the patient support system being put into tilt mode. When the patient support system includes rotational therapy capabilities, the bed software may operate the first and second actuators to rotate the legs to the extended position. The bed software may ensure that the lateral support assembly is in the extended position before allowing the patient support system to go into a tile mode and a stand mode. The lateral support assembly may further include sensors that sense the position of the legs in both the extended position and the retracted position. Additionally, in the retracted position, the legs may be substantially parallel to the side members of the base frame and in the extended position, the legs may be transverse to the side members of the base frame. The patient support system may further include an emergency release to allow the legs to be disassociated with the actuators, so that the legs can be manually moved between the retracted position and the extended position.

BRIEF DESCRIPTION OF THE SEVERAL VIEWS OF THE DRAWING(S)

To understand the present disclosure, it will now be described by way of example, with reference to the accompanying drawings in which embodiments of the disclosures are illustrated and, together with the descriptions below, serve to explain the principles of the disclosure.

Figure 1:
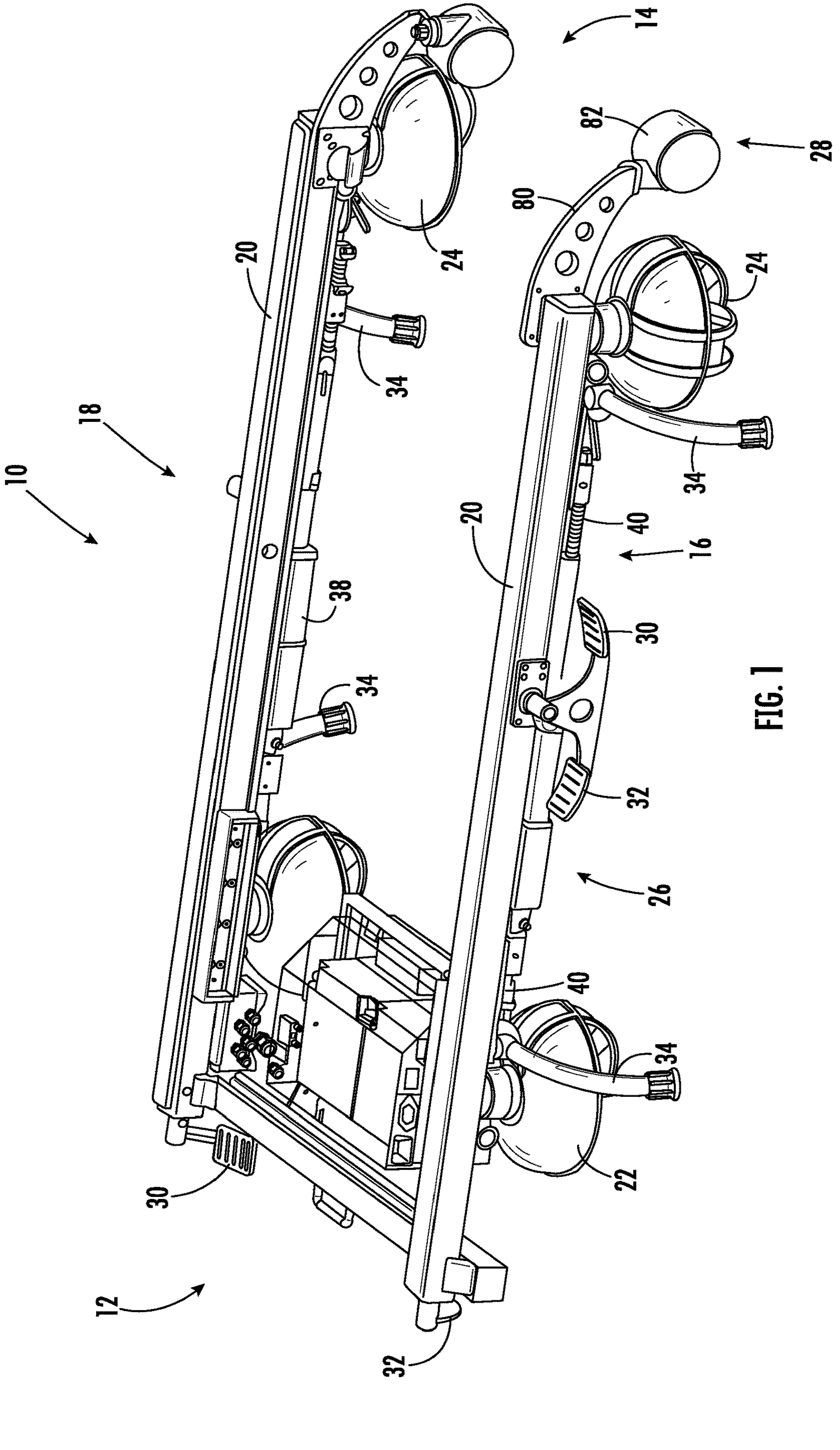
FIG. 1 is a shaded top perspective view of aspects of a bed base assembly frame according to exemplary implementations of the present disclosure.
Figure 2:
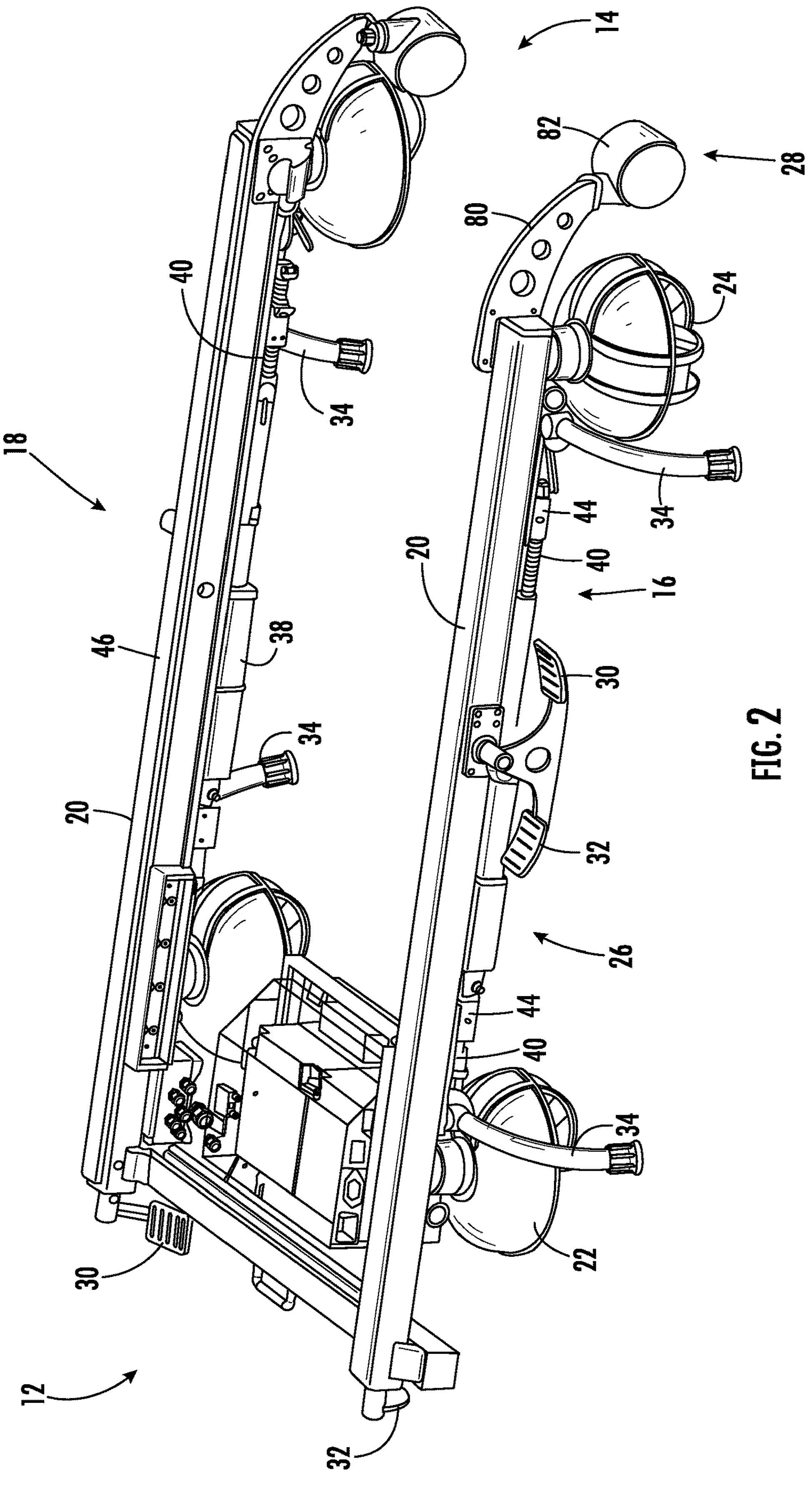
FIG. 2 is a top perspective view of the bed base frame assembly of FIG. 1 in wireframe.
Figure 3:
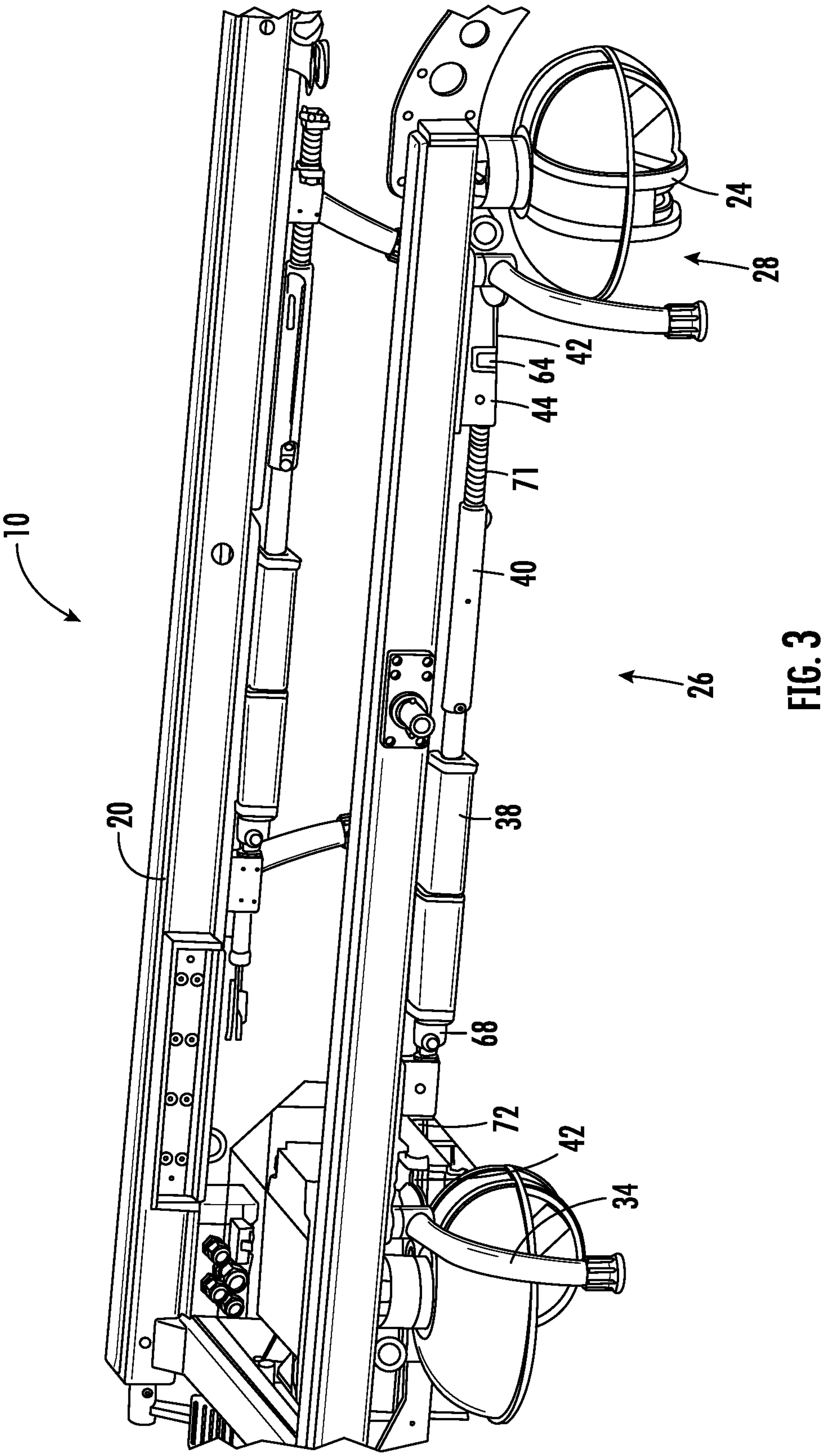
FIG. 3 is a closer top perspective view of the bed base frame assembly of FIG. 2 with one of the brake/steer pedals removed.

Further, it is to be understood that the drawings may represent the scale of different components of one single embodiment; however, the disclosed embodiments are not limited to that particular scale.

DETAILED DESCRIPTION OF THE INVENTION

While the bed base frame assembly discussed herein is susceptible of embodiments in many different forms, there is shown in the drawings, and will herein be described in detail, exemplary implementations with the understanding that the present description is to be considered as an exemplification of the principles of the bed base frame and is not intended to limit the broad aspects of the disclosure to the implementations illustrated.

Referring now to the Figures, there is shown embodiments of a bed base frame assembly 10 that can be used for a variety of beds. The term "bed" herein is used to denote any embodiment of a support for a patient. As such, in different embodiments the "bed" is provided as a traditional bed, a gurney or stretcher, an operating room table or surgical table, a bed that expands and contracts in width, a bed that converts to a chair to allow the patient to exit the bed, a bed that tilts to allow the patient to exit and enter the bed standing, and a variety of combinations thereof. Additionally, each of these variations may have a variety of optional equipment and support surfaces associated therewith.

The bed traditionally has a patient support surface to support the patient. In the standing or tilt embodiment, the bed can be manipulated to angularly rotate the patient support surface to a substantially vertical position, wherein the entire patient support surface is generally in-line and preferably at an angle of about at least 75° from the horizontal, to allow a patient to exit and enter the bed standing. Alternately, the tilt or stand bed may be stopped at any angle between 0° and at least 75° to provide for different therapeutic benefit to the patient. In the expanding width bed configuration the bed is manipulated to convert to a wider patient support surface at various sections of the bed. The width of the expanding width bed may be narrowed, however, to that of a conventional hospital bed to provide for ease of mobility of the bed. Additionally, in one embodiment the bed is a bariatric bed, meaning it is provided to support morbidly obese patients. In the chair bed embodiment the bed is manipulated to achieve both a conventional bed position having a generally horizontal patient support or sleeping surface upon which a user lies in a supine position, and a sitting position wherein the foot deck of the bed is provided in a generally vertical position such that the user's feet can be positioned on or adjacent the floor and the back of the user is supported by a raised back support.

Each bed generally requires a base frame assembly 10, as shown in FIG. 1, which supports additional bed frame assemblies, such as an intermediate frame assembly, a weigh frame assembly, and a patient support assembly (none of the additional frame assemblies are shown in the figures). In various embodiments, the base frame assembly 10 typically has a plurality of actuators (not shown) that raise and lower the intermediate frame assembly. The weigh frame assembly is preferably connected to the intermediate frame assembly, and the patient support assembly is preferably connected to the weigh frame assembly. Generally, the weigh frame assembly may be coupled to the intermediate frame assembly by a plurality of load cells or load beams.

In an embodiment where the bed can tilt to provide standing access and egress, a tilting frame assembly (not shown) is also provided. The tilting frame assembly may be supported by the weigh frame assembly. The tilting frame assembly may preferably be connected with a lift actuator to the intermediate frame assembly to provide for lifting of the tilting frame assembly. Further, in a bed that employs a tilting frame assembly, the tilting frame assembly is preferably connected to the weigh frame assembly, but the tilting frame assembly can be partially removed when in tilt/stand mode. In a bed that does not employ a tilting frame assembly, the patient support assembly is coupled to the weigh frame assembly by a plurality of actuators that raise and lower the different sections of the bed (i.e., a head section, an intermediate or seat section, and a foot section), typically at various angular orientations.

The bed and associated bed base frame assembly 10 has a head end 12, a foot end 14 opposing the head end 12, a first side 16, and a second side 18 opposing the first side 16. The term "head end" is used to denote the end of any referred to object that is positioned nearest the head end 12 of the bed base frame assembly 10, and the term "foot end" is used to denote the end of any referred to object that is positioned nearest the foot end 14 of the bed base frame assembly 10.

In one embodiment, the base frame assembly 10 of the bed generally comprises a base frame 20, a plurality of steerable and lockable casters 22, 24, a lateral support assembly 26 at each of the first and second sides of the base frame assembly 10, and an in-line support assembly 28 at the foot end 14 of the base frame assembly 10. The casters include a pair of casters 22 at the head end 12 of the base frame assembly 10, and a pair of casters 24 at the foot end 14 of the base frame assembly 10. In the tilt or stand-up bed configuration of the bed frame assembly 10, heavy duty casters are preferred.

A preferred embodiment of the base frame assembly 10 also preferably comprises a central brake and steer system. In one embodiment, one aspect of the brake and steer system is that it includes a brake pedal 30 and a steer pedal 32 at the head end 12 of the base frame assembly 10. The brake and steer pedals 30, 32 located near the head end 12 of the base frame assembly 10 are arranged in such a way that the operator who is moving the bed can easily activate the pedals without moving to the sides of the bed. When not transporting the bed, there are two central brake/steer systems located at the middle of each bed side allowing the operator to easily position the casters 22, 24 to the steer or brake positions from the side of the bed. Accordingly, in summary, in a preferred embodiment, one brake pedal 30 and one steering pedal 32 are provided at the head end 12 of the base frame assembly 10, and one brake pedal 30 and one steering pedal 32 are provided on each side of the base frame assembly 10. In one embodiment, all six of the brake and steer pedals 30, 32 are mechanically linked together with a series of mechanical linkages that may extend within the tubing of the base frame 20. As a result, the operator only needs to activate one of the brake/steer pedals 30, 32 to set the entire brake and steer system in either brake mode or steer mode because all of the brake/steer pedals and all of the casters are mechanically linked. Alternately, rather than employing a manual or mechanically linked system to lock/unlock each of the casters 22, 24, the bed may employ an automatic mode to lock/unlock each of the casters 22, 24. In the automatic mode rather than relying on mechanical linkages to lock/unlock each of the casters 22, 24, the bed has an automatic system (not shown) that powers separate actuators for each caster 22, 24 to separately lock/unlock each of the casters 22, 24 as desired. Further, for the automatic mode, a plurality of sensors or switches may be provided at each of the brake and steer pedals 30, 32. The sensors/switches are preferably electrically connected to each of the actuators at each of the casters 22, 24 to separately lock/unlock each of the casters 22, 24. Additionally, when the bed includes an automatic mode to lock/unlock each of the casters 22, 24, the bed may also include an override switch (not shown) at the head end 12 of the base frame assembly 10 to transition the brake and steer system between the automatic mode (using sensors/switches at the pedals 30, 32 to operate actuators at the casters 22, 24 to lock/unlock each caster) and the manual mode (using mechanical linkages to mechanically connect each of the pedals 30, 32 with the casters 22, 24 to lock/unlock each caster).

There are three modes to the brake and steer system: (1) brake mode; (2) neutral mode; and, (3) steer mode. The brake mode is set by fully engaging/pressing any of the three brake pedals 30. When in the brake mode all four casters 22, 24 will be simultaneously locked to prevent the bed from moving. The neutral mode is set by positioning any of the brake/steer pedals 30, 32 to the middle position, which is the neutral position. In the neutral position all four of the casters 22, 24 are placed in the fully rotatable and unlocked orientation. The steer mode is set by fully engaging/pressing any of the three steer pedals 32. In the steer position, one or more of the casters at the foot end 14 of the bed will lock in the forward position, through a mechanical linkage connected from the steer pedals 32 to the caster(s) at the foot end 14 of the base frame assembly 10 to assist in overall steering capabilities of the bed during transport.

The brake and steer system is supported by a brake or caster lock function in the bed's software that ensures that the brake system is in the lock mode before allowing the bed to go into tilt or stand mode. For example, if the user attempts to place the bed into tilt/stand mode and the caster/brake lock is not engaged, the software will provide an alarm and will preclude the user from actuating tilt/stand mode. Once the bed is placed into brake lock mode (i.e., all casters are locked either mechanically or with actuators) the software will disarm the alarm and allow the user to place the bed in tilt/stand mode. Further, once in tilt/stand mode, the software will not allow the brake lock mode to be disengaged until the bed is back in the full horizontal position. The brake and steer system uses either a solenoid or actuator that is operated by the software to maintain the brake lock in brake mode during tilt/stand operations. In the automatic mode, the brake and steer system will maintain the actuators in the lock mode during tilt/stand operations to keep each caster locked. The caster lock function locks the casters to prevent any unexpected movement of the bed during tilt/stand mode.

In a preferred embodiment, as explained herein, the lateral support assemblies 26 are operated by the bed's software, similar to the brake and steer system in certain modes.

Referring to the figures, each side 16, 18 of the bed has a separate lateral support assembly 26. As shown in FIGS. 3-6, each of the lateral support assemblies 26 may generally include first and second legs 34, a support 36 for each leg 34, an actuator 38, extensions 40 connected to each end of the actuator 38, and linkages 42 connecting the extensions 40 to the legs 34. The lateral support assembly 26 preferably also includes lateral supports 44 for the actuator 38. As explained herein, in one embodiment the actuators 38 are supported by the lateral supports 44 via the extensions 40. Accordingly, in one embodiment, the actuators 38 are not fixed laterally, but instead can traverse laterally based on the actuation stroke and stops between the extensions 40 and the lateral supports 44.

The lateral support assembly 26 preferably has two positions, an extended or use position, shown by the position of the legs 34 at the first side 16 of the base frame assembly 10 in FIGS. 1-3 and 6-11, and the retracted position, shown by the position of the legs 34 at the second side 18 of the base frame assembly 10 in FIGS. 1-3 and 6-11. In the use position the legs 34 are preferably transverse to the side frame members 46 of the based frame 20, and in the retracted position the legs 34 are preferably generally in-line or substantially parallel to the side frame members 46 of the base frame 20. As explained herein, the legs 34 preferably rotate from the retracted position to the use position due to the rotational connection between the legs 34 and their respective supports 36, and the action of the actuator 38. The legs 34 may rotate either clockwise or counter-clockwise from the retracted position to the use position and from the use position to the retracted position in accordance with aspects of this invention.

Figure 9:
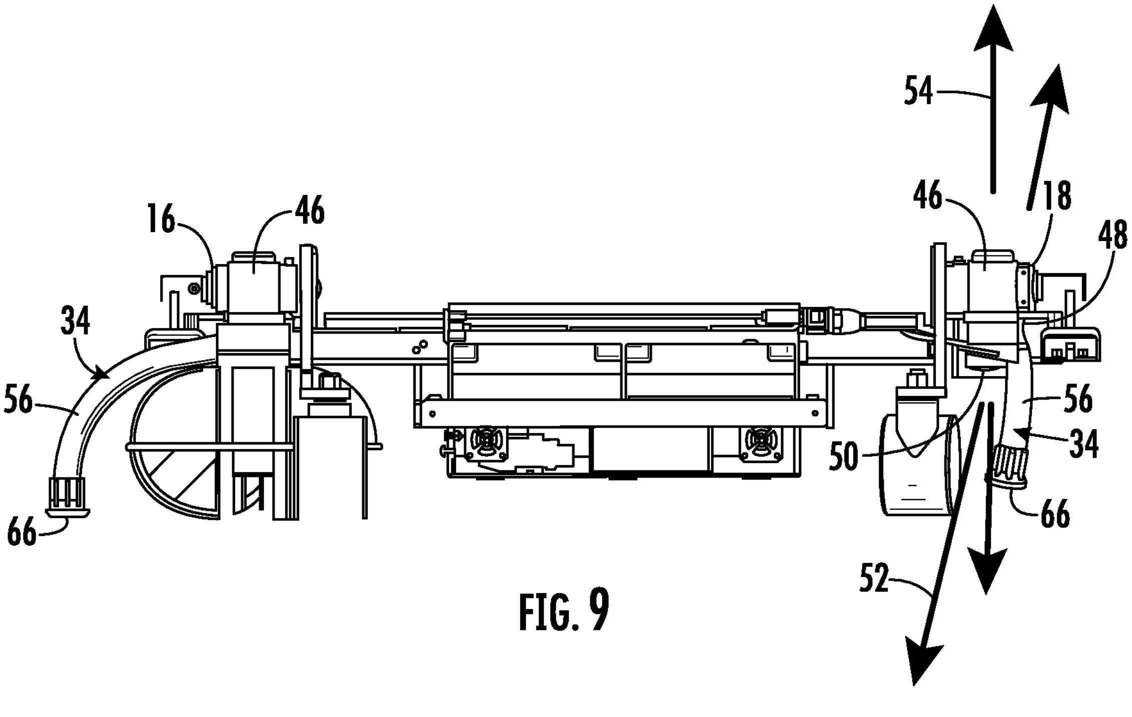
FIG. 9 is a rear end elevation view of the bed base frame assembly of FIG. 2 taken from the foot end of the bed.

In one embodiment the support 36 for each leg 34 comprises a flange portion 48 and a shaft portion 50. As shown in FIG. 9, the shaft portion 50 is angled inwardly toward the opposing side of the base frame 20, such that the longitudinal axis 52 of the shaft portion 50 of the support 36 is transverse to the vertical axis 54 extending through the side frame members 46 of the base frame 20.

Each leg 34 preferably has an extension portion 56, which may be a curved tubular extension portion 56 as shown in the figures, a receiving portion 58 that rotatingly engages the shaft portion 50 of the support 36, and a flange portion 60 to connect the legs 34 to a first end 62 of the linkages 42. In a preferred embodiment, the flange portions 60 of the legs 34 are pivotally connected to the linkages 42.

The second end 64 of the linkages 42 are pivotally connected to the one of the extensions 40 from the actuator 38. Accordingly, the flange portion 60, linkage 42 and extension 40 forms a three-bar linkage mechanism whereby linear motion of the extension 40 is converted into rotational motion of the leg 34.

Figure 10:
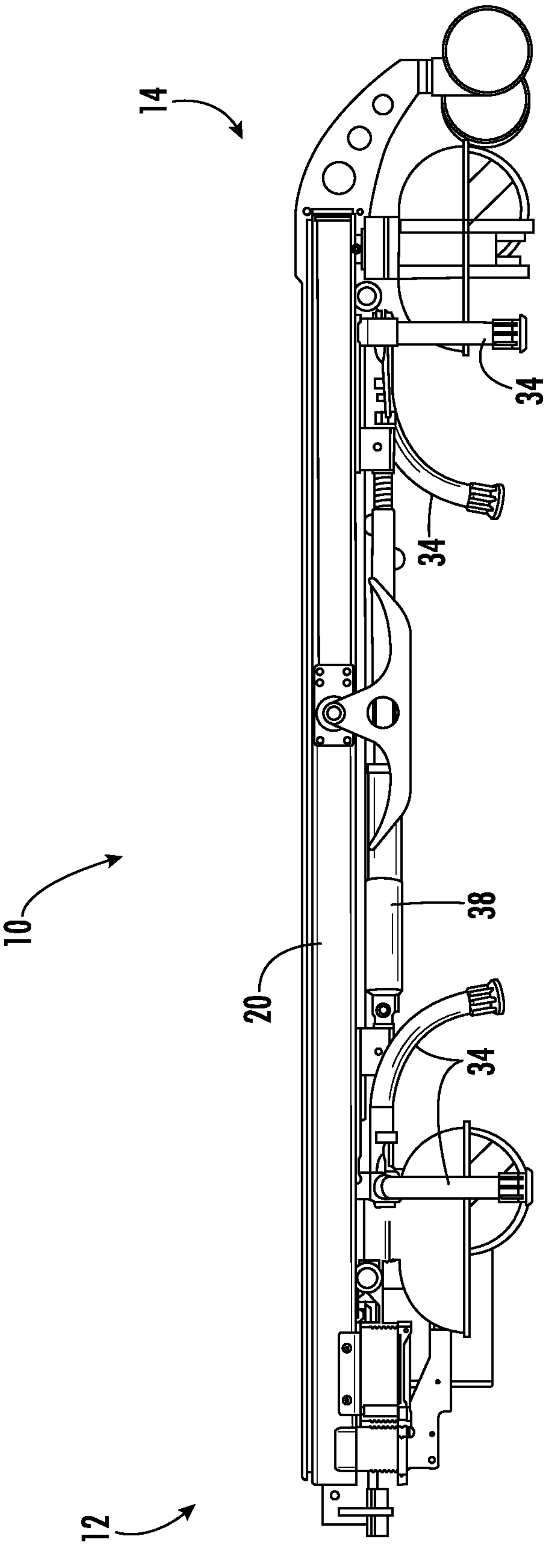
FIG. 10 is a first side elevation view of the bed base frame assembly of FIG. 2.
Figure 11:
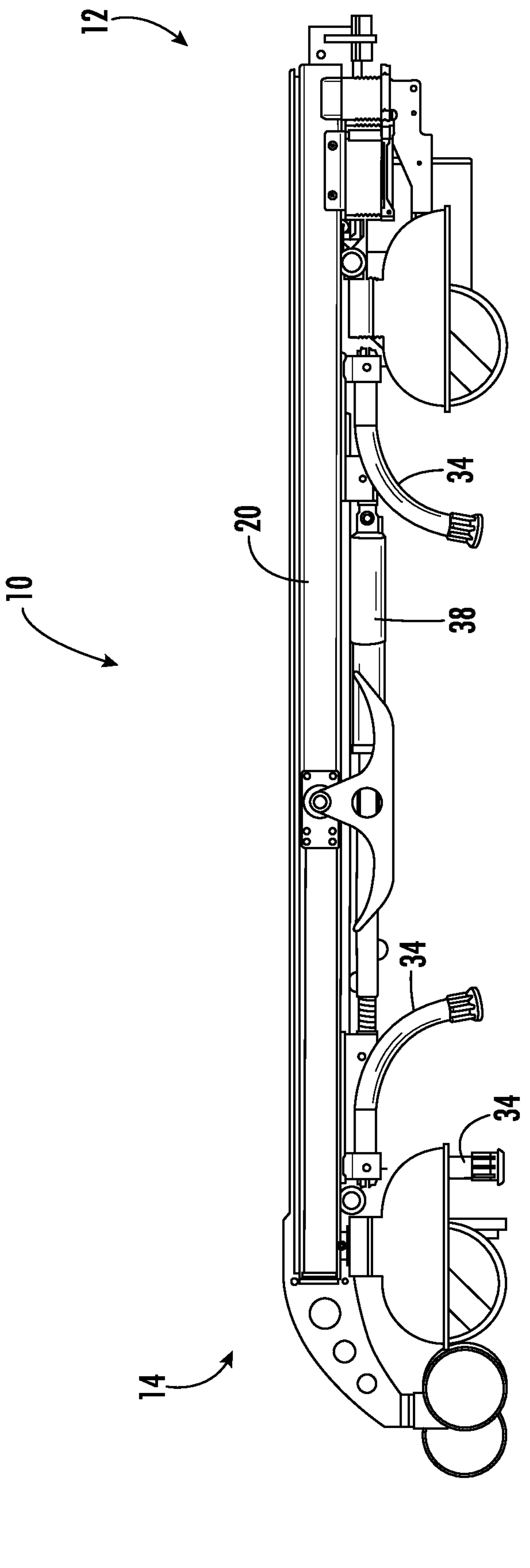
FIG. 11 is a second side elevation view of the bed base frame assembly of FIG. 2.

As shown in FIGS. 9-11, in one embodiment the end 66 of the legs 34 of the lateral support assembly 26 is higher off the floor (i.e., the distance from the floor to the bottom of the end of the leg is greater) when the legs 34 are in the retracted position (i.e., the legs 34 at the second side 18 of the base frame assembly 10), than when the legs 34 are in the extended or use position (i.e., the legs 34 at the first side 16 of the base frame assembly 10). This is because, as explained above, in one embodiment, the supports 36 to which the legs 34 are rotationally connected have a shaft portion 50 that is transverse to the vertical axis 54 extending through the side frame members 46 of the base frame 20. Accordingly, as the leg 34 rotates from the retracted position, generally parallel to the side frame members 46 of the base frame 20, to the use position, generally transverse or perpendicular to the side frame members 46 of the base frame 20, the end 66 of the legs 34 moves closer to the ground.

Figure 4:
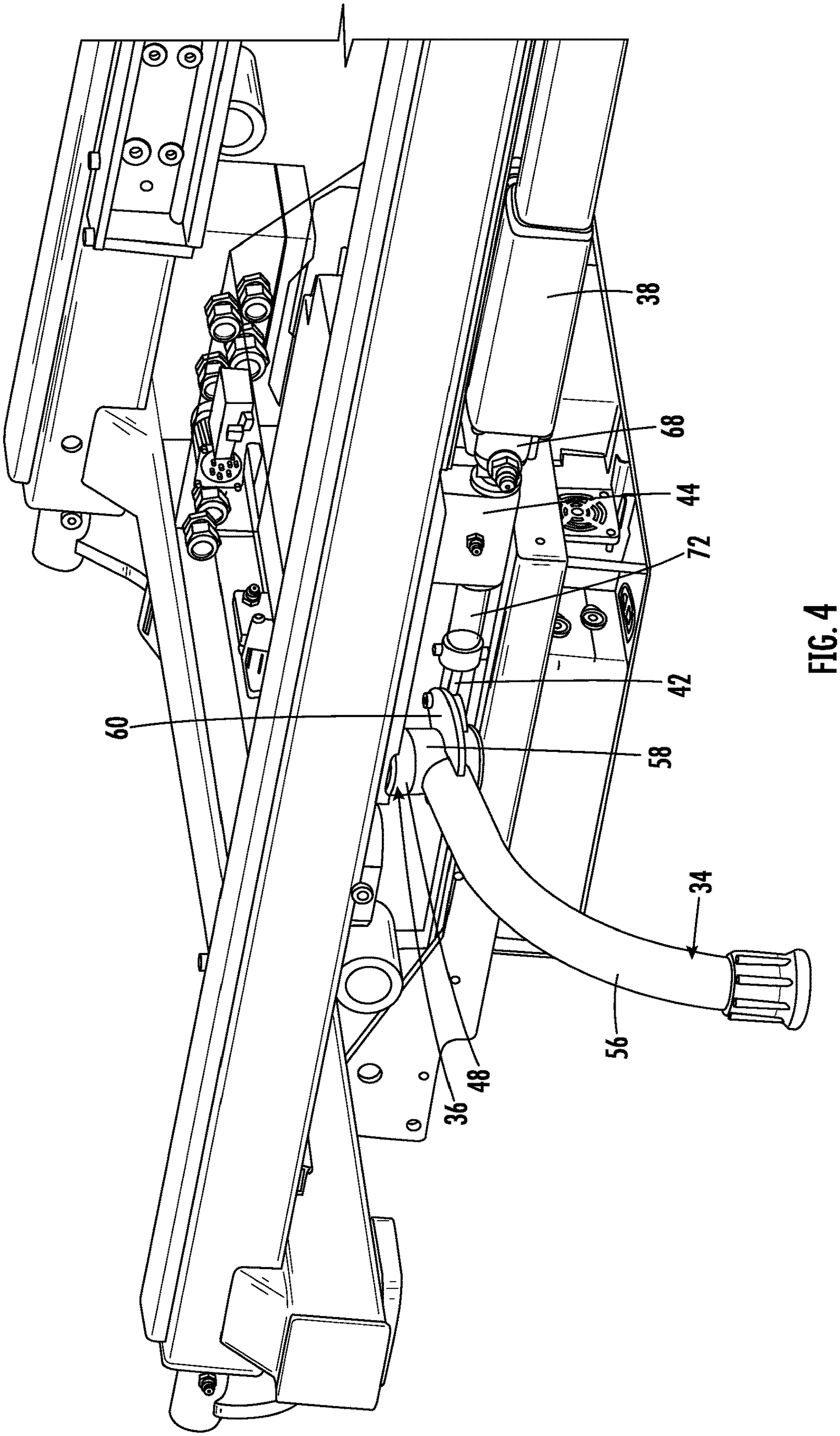
FIG. 4 is a closer top perspective view of one of the extended lateral legs of the bed base frame assembly of FIG. 2.
Figure 5:
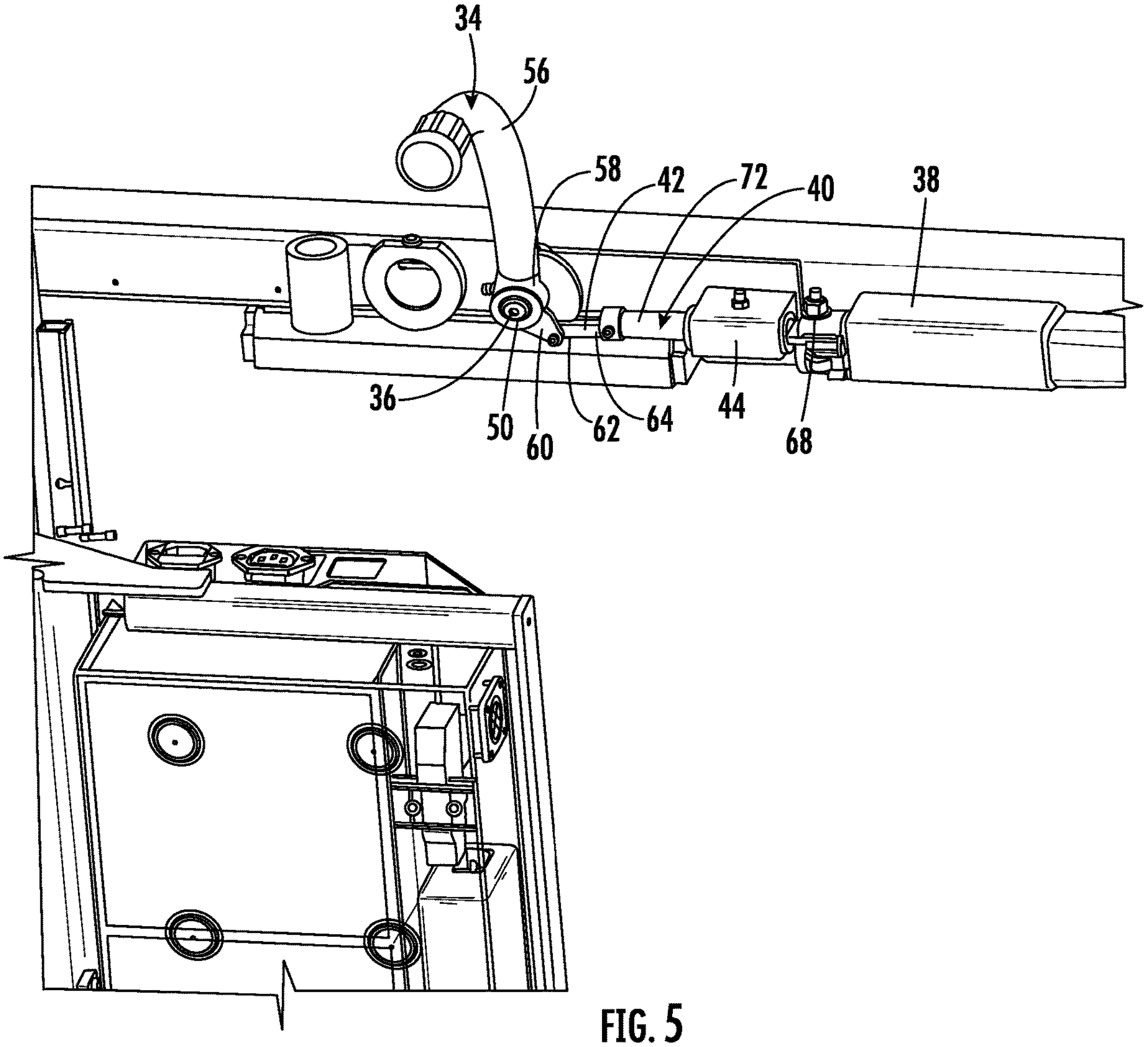
FIG. 5 is a closer bottom perspective view of one of the extended lateral legs of the bed base frame assembly of FIG. 2.
Figure 6:
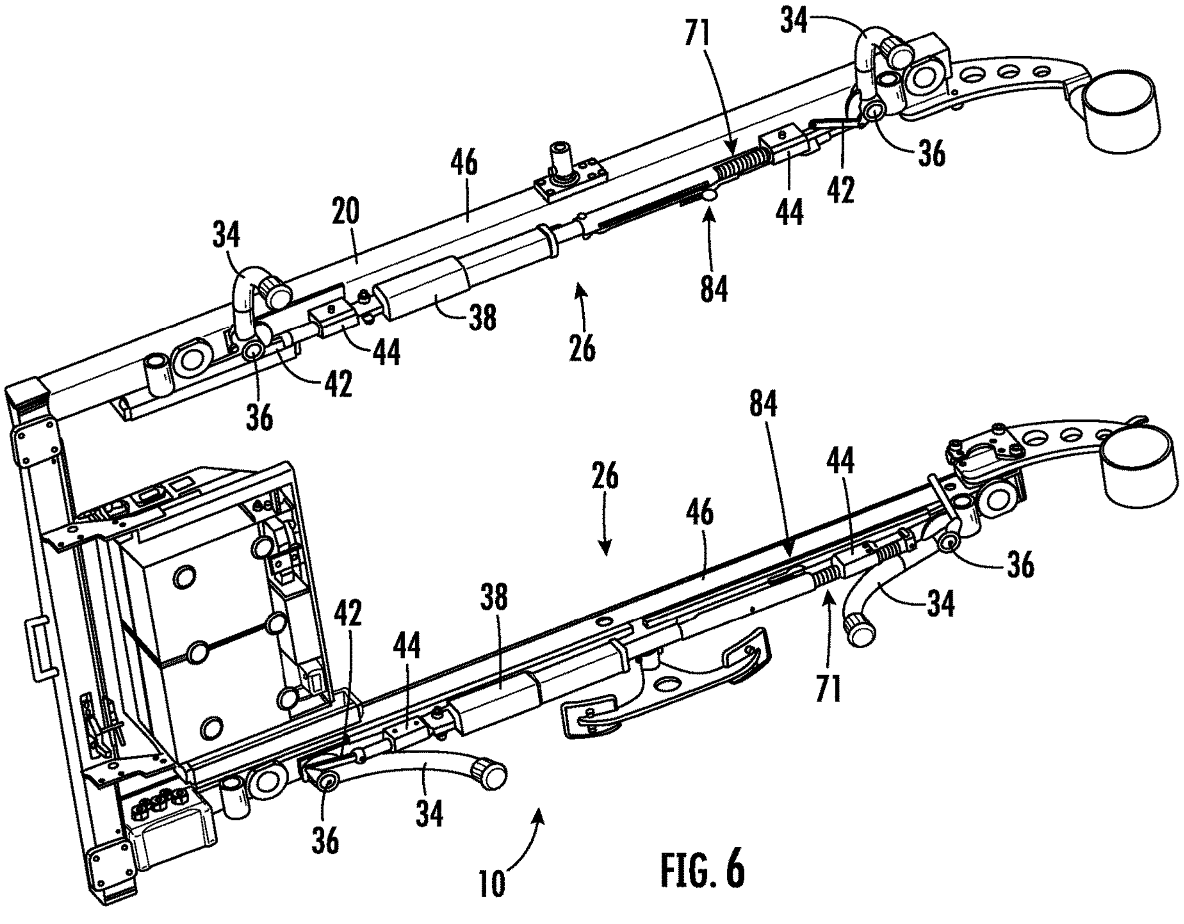
FIG. 6 is a bottom perspective view of the bed base frame assembly of FIG. 3.

Referring to FIGS. 2-7, the lateral support assembly 26 also utilizes two lateral supports 44 to support each actuator 38. Preferably, one lateral support 44 is connected to the bottom of the side frame member 46 of the base frame 20 on one side of the actuator 38, and another lateral support 44 is connected to the bottom of the side frame member 46 of the base frame 20 on the other side of the actuator 38. In a preferred embodiment the actuator 38 is a linear actuator. Accordingly, in one embodiment one end of the linear actuator 38 has a receiver 68 and the other end has an actuator shaft 70 that transitions outwardly and inwardly from the linear actuator 38. The actuator shaft 70 may be a lead screw in an alternate embodiment. Preferably, the actuator shaft 70 has a set distance that it moves inwardly and outwardly, referred to as the stroke. The stroke is set such that at one end of the stroke the two legs 34 are fully retracted in the retracted position, and at the other end of the stroke the two legs are fully extended in the use position. Additionally, the actuator shaft 70 may alternately have a spring 71 associated therewith toward a distal end thereof, as shown in FIG. 6. The spring 71 may assist the leg 34 at the foot end 14 swing out prior to the leg 34 at the head end 12, and similarly, the spring 71 may assist in having the leg 34 at the foot end 14 retract after the leg 34 at the head end 12.

As shown in FIGS. 4 and 5, an extension shaft 72 may be fixedly connected at one end to the receiver 68 of the actuator 38, and at the other end to the second end 64 of the linkage 42. The extension shaft 72 that connects the actuator 38 to one of the linkages 42 is referred to as one of the extensions 40. The extension shaft 72 is supported by bushings in one of the lateral supports 44, but the extension shaft 72 is preferably able to slide laterally within the lateral support 44, but only if and when the actuator 38 moves as the extension shaft 72 is fixed in place to the actuator 38. The movement of this extension 40 laterally operates to rotate the leg 34 closest to the foot end 14 of the base frame 20.

The other extension 40 of the actuator 38 is the actuator shaft 70 or lead screw 70 that extends in and out of the actuator 38. The end of the actuator shaft 70 is connected to the second end 64 of the other linkage 42. The actuator shaft 70 is supported by the other lateral support 44, but the actuator shaft 70 is similarly able to move laterally within the lateral support 44. The movement of this extension 40 laterally operates to rotate the leg 34 closest to the head end 12 of the base frame 20. Unlike the extension shaft 72 which has no movement relative to the actuator 38 and which only moves with the actuator 38, all movement of the actuator shaft 70 is movement relative to the actuator 38 (i.e., in or out of the actuator 38).

The lateral support assembly 26 provides additional lateral support for the bed. Such additional lateral support may be needed under numerous circumstances. For example, if the bed is put into bariatric mode, meaning width extenders are utilized then additional lateral support may be needed. Similarly, if the bed is put into tilt mode and the patient support surface is tilted upwardly to the vertical, additional lateral support may be needed as the center of gravity of the patient is raised. Further, if the bed has rotational therapy capabilities, the additional lateral support may be beneficial, especially with bariatric beds.

Figure 7:
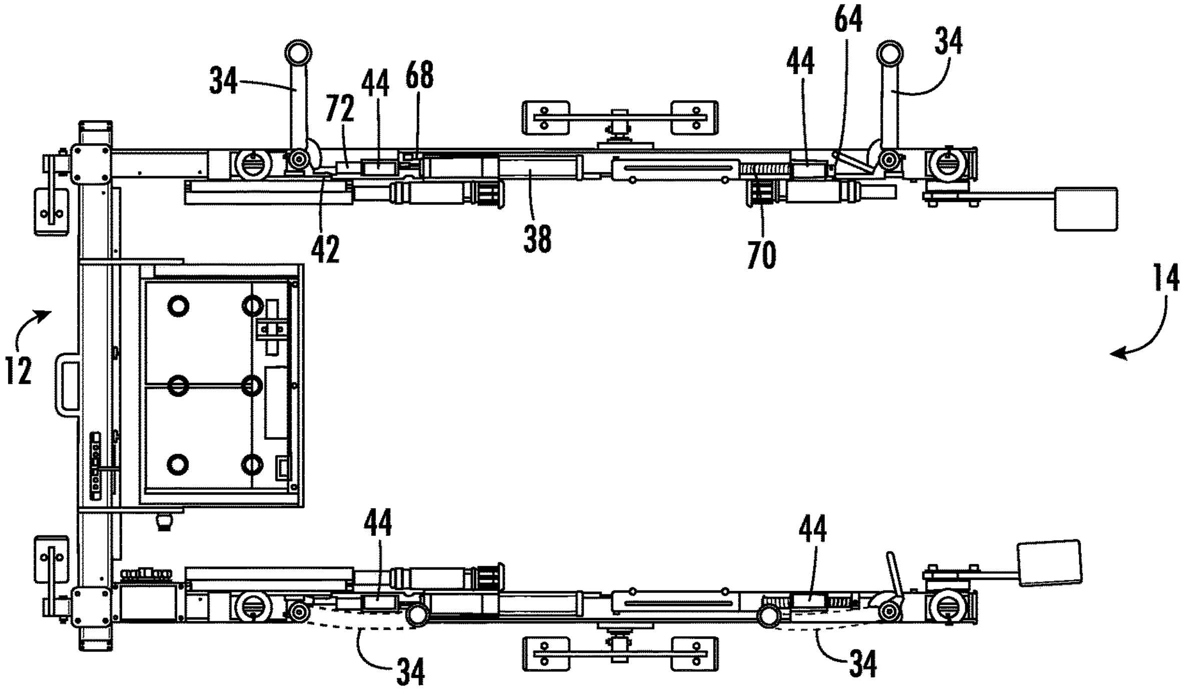
FIG. 7 is a bottom plan view of the bed base frame assembly of FIG. 2.
Figure 8:
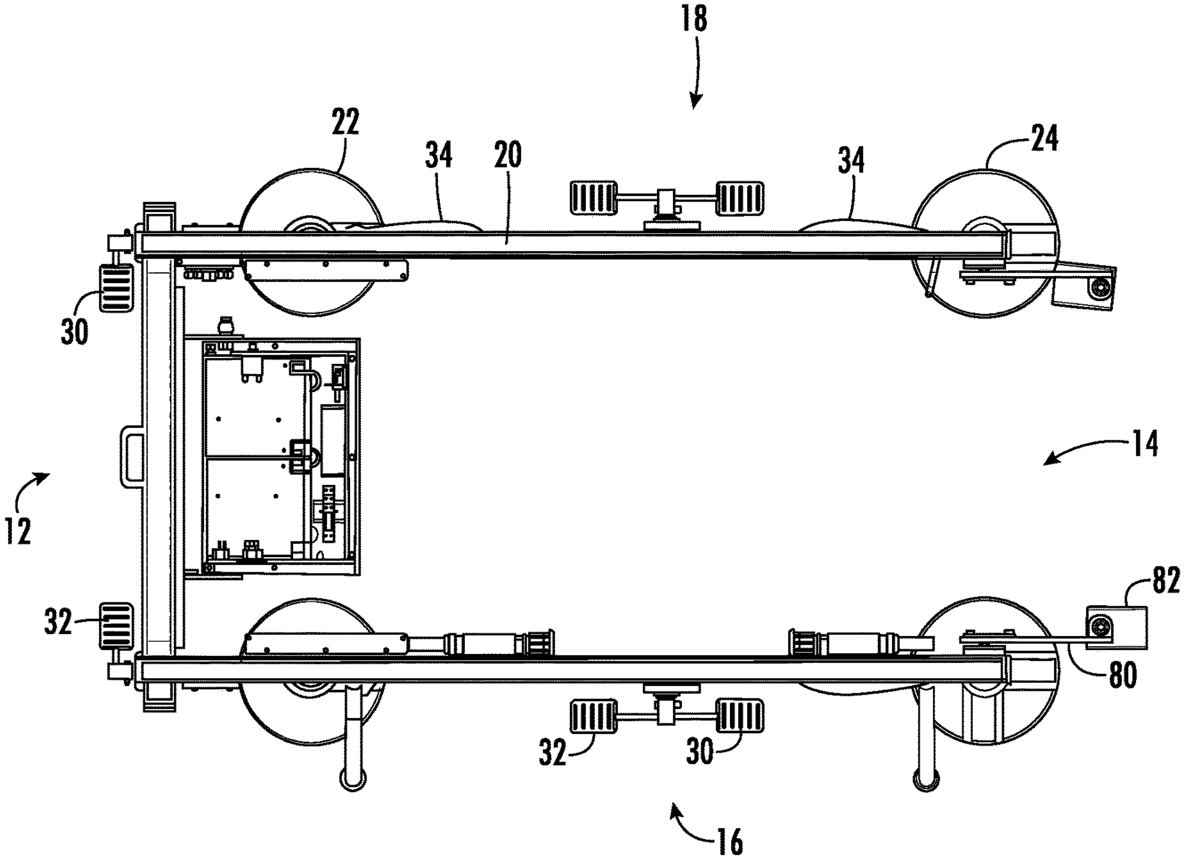
FIG. 8 is a top plan view of the bed base frame assembly of FIG. 2.

As explained above, there are two modes to the lateral support assembly 26: (1) retracted mode, and (2) use mode. In the retracted mode, the software of the bed will operate the two actuators 38 to transition both legs 34 on each side of the base frame 20 to the retracted position. Referring to FIGS. 7 and 8, the two legs 34 on the second side 18 of the base frame 20 are in the retracted position. In the use mode, the software of the bed will operate the two actuators 38 to transition both legs 34 on each side of the base frame 20 to the use or extended position. Referring to FIGS. 7 and 8, the two legs 34 on the first side 16 of the base frame 20 are in the use or extended position. It is understood that the figures illustrate one set of legs in the use position and one set of legs in the extended position for illustrative and teaching purposes only. In actual use all legs will be either in the use or retracted positions generally together.

The lateral support assembly 26 is generally controlled by a function in the bed's software that ensures that the lateral support system is in the use or extended mode before allowing the bed to go into some other configuration, such as tilt or stand mode. For example, if the user attempts to place the bed into tilt/stand mode and the lateral support system is not in the use mode, the software will preclude the tilt/stand mode from being utilized. Alternately, if the user attempts to place the bed into tilt/stand mode and the lateral support system is not in the use mode, the software will first place the lateral support system in the use mode before allowing the user to begin the tilt/stand process. Once the bed is placed into tilt/mode the software will maintain the legs in the use position until the tilt/stand mode is completed.

In use, when the system wants to transition the lateral support assembly 26 from the retracted mode to the use mode, the bed software sends a signal to each of the two actuators 38. In one embodiment, the two actuators 38 will begin to retract their actuator shaft 70 which causes the extension 40 and linkage 42 to move linearly toward the actuator 38 and which further causes the leg 34 closest to the head end 12 of the base frame 20 to rotate from the retracted position to the use position. When the leg 34 closest to the head end 12 of the base frame 20 is fully in the use position, a portion of the extension 40 will contact an edge of the lateral support 44. However, the actuator 38 continues to retract the actuator shaft 70, thereby causing the actuator 38 to move toward the head end 12 of the base frame 20. When the actuator 38 moves toward the head end 12 of the base frame 20 the extension shaft 72 that is fixed to the actuator 38 also moves toward the head end 12 of the base frame 20, causing the linkage 42 connected to the foot end 14 leg 34 to rotate from the retracted position to the use position. When the leg 34 closest to the foot end 14 of the base frame 20 is fully in the use position the actuator 38 will stop further movement. As one can understand based on the figures, the leg 34 at the head end 12 of the bed will rotate outward and toward the head end 12 of the base frame 20, and the leg 34 at the foot end 14 of the bed will rotate outward and toward the foot end 14 of the base frame 20. Further, as the legs 34 rotate from the retracted to the use position the ends 66 of the legs 34 will move toward the ground. This allows the end 66 of the legs 34 to be raised in the retracted position and not be a pinch point, but also allows the end 66 of the legs 34 to be closer to the ground in the use position to prevent tipping of the bed.

To retract the legs 34 from the use position to the retracted position, the bed software sends a signal to each of the two actuators 38. In one embodiment, the two actuators 38 will begin to extend their actuator shaft 70 which initially causes the actuator 38 to move linearly toward the foot end 14 of the base frame 2, and which further causes the extension shaft 72 that is fixed to the actuator 38 to also move toward the foot end 14 of the base frame 20, causing the linkage 42 connected to the foot end 14 leg 34 to rotate from the use position to the retracted position. When the leg 34 closest to the foot end 14 of the base frame 20 is fully in the retracted position, a portion of the actuator 38 will contact an inner edge of the lateral support 44 preventing the actuator 38 from moving. When the actuator 38 cannot move and the actuator shaft 70 is still being extended, the actuator shaft 70 will cause the linkage 42 connected head end 12 leg 34 to rotate from the use position to the retracted position. When the leg 34 closest to the head end 12 of the base frame 20 is fully in the retracted position the actuator 38 will stop further movement. As one can understand based on the figures, the leg 34 at the head end 12 of the bed will rotate inwardly and toward the foot end 14 of the base frame 20, and the leg 34 at the foot end 14 of the bed will rotate inwardly and toward the head end 12 of the base frame 20 during retraction. Further, as the legs 34 rotate from the use position to the retracted position the ends 66 of the legs 34 will move away from the ground. This allows the end 66 of the legs 34 to be raised in the retracted position and not be a pinch point.

In another embodiment, the lateral support assembly 26 may include a plurality of sensors or switches that may be provided at each of the legs 34 and/or supports 36. The sensors/switches are preferably electrically connected to each of the actuators 38 at each of the legs 34 and/or supports 36 to separately lock/unlock each of the legs 34 and/or supports 36. The sensors/switches may be utilized to lock/unlock the legs 34 from moving to the retracted position or extended position based on the configuration of the bed. For example, if the user attempts to place the bed into tilt/stand mode, the sensors/switches will confirm that the lateral support assembly 26 and the legs 34 are in the extended position, and the bed software may preclude the tilt/stand mode from being utilized until the lateral support assembly 26 and the legs 34 are in the extended position. Alternately, if the user attempts to move the bed, the sensors/switches will confirm that the lateral support assembly 26 and the legs 34 are in the retracted position, and the bed software may preclude movement of the bed until the lateral support assembly 26 and the legs 34 are in the retracted position.

While the embodiments in the figures show four separate legs 34 as part of the lateral support assembly 26, additional legs 34 may be utilized without departing from this invention. For example, the lateral support assembly 26 may include six legs 34 or eight legs 34 without departing from this invention.

The lateral support assembly 26 may also have an emergency release to allow the legs 34 to be disassociated from the actuator 38. Specifically, as best shown in FIG. 6, an emergency pin 84 may be provided that joins the legs 34 to the extensions 40. By removing the pin 84 the legs 34 can be manually moved between the retracted and use positions, and they can be repositioned in any position desired by the user.

The in-line support assembly 28 at the foot end 14 of the base frame assembly 10 is provided to provide support from forward tipping of the bed, and also to provide a support surface outside of the casters 24 at the foot end 14 of the base frame assembly 10 during periods of movement of the bed. In one embodiment, the in-line support assembly 28 comprises a bracket 80 connected to each side frame member 46 of the base frame 20 at the foot end 14 of the base frame 20, with a wheel 82 connected to the end of the bracket 80 distal the base frame 20. The in-line support assembly 28 and the bracket 80 may be fixedly attached to each side frame member 46 of the base frame 20. In another embodiment, the in-line support assembly 28 and the bracket 80 may be rotatedly-attached to the side frame members 46 of the base frame 20, wherein the bracket 80 rotates from a retracted position to an extended position. In another embodiment, the in-line support assembly 28 and the bracket 80 may extend from the side frame members 46 of the base frame 20 from a retracted position to an extended position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

We claim:

1. A hospital bed comprising:
a base frame;
the base frame includes a first side member;
a first leg connected to the first side member;
the base frame includes a second side member;
a second leg connected to the second side member;
an actuator connected to the first leg to cause the first leg to move from a retracted position to an extended position; and
wherein in the retracted position, the first leg is substantially parallel to the first side member of the base frame and in the extended position, the first leg is substantially transverse to the first side member of the base frame.

2. A hospital bed as in claim 1 wherein the second leg has a retracted position and an extended position, in the retracted position, the second leg is substantially parallel to the second side member of the base frame and in the extended position, the second leg is substantially transverse to the second side member of the base frame.

3. A hospital bed as in claim 2 further including a second actuator connected to the second leg to cause the second leg to move from the retracted position to the extended position.

4. A hospital bed as in claim 3 further including a third leg connected to the first side member.

5. A hospital bed as in claim 4 wherein the first actuator is connected to the third leg to cause the third leg to move from a retracted position to an extended position.

6. A hospital bed as in claim 5 further including a fourth leg connected to the second side member.

7. A hospital bed as in claim 6 wherein the second actuator is connected to the fourth leg to cause the fourth leg to move from a retracted position to an extended position.

8. A hospital bed as in claim 1 wherein the first leg is rotatably connected to the first side member and the second leg is rotatably connected to the second side member.

9. A hospital bed as in claim 1 wherein the first leg includes a shaft portion, the shaft portion angled inwardly toward the first side member such that a longitudinal axis of the shaft portion crosses a vertical axis extending through the first side member.

10. A hospital bed as in claim 1 further including one or more casters connected to the base frame.

11. A hospital bed as in claim 1 further including a patient deck.

12. A hospital bed as in claim 11 further including an intermediate frame connected to the patient deck and the base frame.

13. A hospital bed as in claim 11 wherein the first leg must be in the extended position in order for the patient deck to be tilted relative to the horizontal.

14. A hospital bed as in claim 13 further including a locking system that stabilizes the bed prior to the patient deck being tilted into a tilted position.

15. A hospital bed as in claim 14 wherein the locking system stabilizes the bed by locking one or more casters.

16. A hospital bed as in claim 14 wherein the locking system is in a lock mode before allowing the patient deck to go into a tilted position.

17. A hospital bed as in claim 14 wherein the locking system includes a brake lock function, when the patient deck is in the tilted position, the locking system prevents the brake lock function from becoming disengaged until the patient deck is rotated back to a generally horizontal position.

18. A hospital bed comprising:
a base frame;
the base frame includes a first side member;
a first leg connected to the first side member;
the base frame includes a second side member;
a second leg connected to the second side member;
an actuator connected to the first leg to cause the first leg to move from a retracted position to an extended position; and
an emergency release to allow the first leg to be disassociated with the actuator, so that the first leg can be manually moved between the retracted position and the extended position.

19. A hospital bed as in claim 18 including a second actuator connected to the second leg to cause the second leg to move from the retracted position to the extended position, the emergency release to allow the second leg to be disassociated with the second actuator, so that the second leg can be manually moved between the retracted position and the extended position.

20. A hospital bed as in claim 18 further including a third leg connected to the first side member and a fourth leg connected to the second side member.

* * * * *